(12) United States Patent
Kennedy et al.

(10) Patent No.: US 7,086,691 B2
(45) Date of Patent: Aug. 8, 2006

(54) MULTI-POSITION FENDERS

(75) Inventors: Craig Kennedy, Viking, MN (US); Timothy Benedict, Thief River Falls, MN (US); Neil T. Amundsen, Minneapolis, MN (US)

(73) Assignee: Arctic Cat Inc., Thief River Falls, MN (US)

( * ) Notice: Subject to any disclaimer, the term of this patent is extended or adjusted under 35 U.S.C. 154(b) by 0 days.

(21) Appl. No.: 10/749,320

(22) Filed: Dec. 29, 2003

(65) Prior Publication Data

US 2005/0140178 A1   Jun. 30, 2005

(51) Int. Cl.
*B62D 25/18* (2006.01)
(52) U.S. Cl. ............... 296/198; 293/1; 280/154; 280/157; 280/854
(58) Field of Classification Search ........... 296/198; 293/1; 280/847, 848, 154, 157, 854
See application file for complete search history.

(56) References Cited

U.S. PATENT DOCUMENTS

| | | | | |
|---|---|---|---|---|
| 817,203 | A * | 4/1906 | Thompson | 280/154 |
| 1,107,826 | A * | 8/1914 | Mullins | 280/848 |
| 1,358,890 | A * | 11/1920 | Snell | 280/154 |
| 4,591,178 | A * | 5/1986 | Mortvedt et al. | 280/154 |
| 4,923,319 | A * | 5/1990 | Dent | 403/2 |
| 5,169,167 | A * | 12/1992 | Willson et al. | 280/157 |
| 6,367,841 | B1 * | 4/2002 | Matthew | 280/847 |
| 6,547,027 | B1 * | 4/2003 | Kalhok et al. | 180/312 |
| 6,755,268 | B1 * | 6/2004 | Polz et al. | 180/69.21 |

\* cited by examiner

*Primary Examiner*—Dennis H. Pedder
(74) *Attorney, Agent, or Firm*—Black Lowe & Graham, PLLC

(57) ABSTRACT

A movable fender for a vehicle. The fender body is movable between at least first and second positions relative to the vehicle, and is removable so as to be readily installed, removed, and replaced. The fender body may be engaged with the vehicle via a mounting assembly. The fender body may be disposed at the first and second positions with either of a unique first and second mounting assemblies, with either of a first and a second mounting assembly having some common components, with a fully common mounting assembly, or with both first and second mounting assemblies simultaneously arranged on the fender bodies. The mounting assembly may include a bracket disposed between the vehicle and the fender body, and may include connectors for connecting the fender body in place. The mounting assembly may engage a first mounting location on the vehicle to dispose the fender body at the first position, and a second mounting location on the vehicle to dispose the fender body at the second position. One of the first and second mounting locations may be on the vehicle's suspension, and another of the first and second mounting locations may be on the vehicle's frame. The fender bodies may be of different material, different thickness, different color, or different texture from one another or from the vehicle body.

18 Claims, 29 Drawing Sheets

MULTI-POSITION FENDERS

BACKGROUND OF THE INVENTION

1. Field of the Invention

The invention relates to a fender for a vehicle. More particularly, the invention relates to a fender for an all terrain vehicle that may be configured in multiple positions.

2. Description of Related Art

Fenders and their use on vehicles are well known. In particular, fenders commonly are used on vehicles intended for travel off-road, such as ATV or all-terrain vehicles. Fenders typically serve as obstructions. For example, on an ATV, fenders may be used for example to block debris kicked up by the wheels, to act as a barrier to prevent a rider's feet from contacting the tires or other moving parts of the vehicle, etc.

Conventionally, fenders are incorporated into the body of the vehicle. Commonly, they are an integral part of the vehicle body. That is, the fender is continuous with the body, rather than being a separate piece. Even when conventional fenders are constructed as separate pieces from the vehicle body, they often are attached permanently to the vehicle, or at least in such a way that they cannot be removed or adjusted without considerable difficulty.

This conventional arrangement presents a number of disadvantages.

In certain circumstances it may be desirable to remove fenders from a vehicle. For example, the total weight of the vehicle is especially important for racing vehicles. The absence of fenders normally does not impair the basic functionality of a vehicle, i.e. it still can be operated. Therefore, when racing, it may be preferred to remove the fenders in order to minimize the weight of the vehicle, and thereby enhance its performance.

Likewise, in some circumstances it may be desirable to change the position of the fenders on a vehicle. The optimum position for a vehicle fender may vary, depending on a variety of factors. For example, with regard to their use as shields against debris kicked up by the wheels, the optimum position of the fenders may vary depending on the terrain that is being traversed, e.g. snow, mud, sand, gravel, etc. Similarly, with regard to their use as a barrier between a vehicle operator or passenger and the wheels or other moving parts, the preferred position of the fenders may vary depending on the number of persons on the vehicle, their height, weight, etc.

Furthermore, it may be necessary to replace the fenders of a vehicle. Fenders may damaged by rough terrain, impacts with hazards such as brush, trees, rocks, etc. In ATVs and other vehicles that are intended for use in difficult terrain, this is of particular concern. Conventionally, replacing the fenders on a vehicle is possible only if entire body panels are replaced. Often the body panels that incorporate conventional fenders are significantly larger than the fenders themselves. In some instances, the vehicle body may consist of a single integral piece of material, so that replacing a fender requires replacement of the entire vehicle body. Replacing large sections of a vehicle body when only the fender is actually in need of replacement may be inefficient, time-consuming, and/or expensive.

In addition, fenders that are incorporated as an integral part of the vehicle body normally must be made of the same material as the rest of the body. Thus, if a fender of a stronger material is desired, it may be necessary to use that material in the rest of the body as well. This may be disadvantageous for reasons such as cost, weight, etc.

Also, forming a vehicle body as a single piece may be disadvantageous regardless of the materials used. For example, the molds, dies, or other tooling used to produce the body generally become larger and more expensive as the body becomes larger and more complex. Thus, reducing the size of the panel or panels making up the body may reduce the cost and difficulty of producing the body.

Fenders that are permanently or semi-permanently attached to a vehicle, as is conventional, cannot readily be adjusted, removed, or replaced to address disadvantages such as those described above.

As a further matter, conventional fenders generally are made to be attached to only a single location on a vehicle. Thus, even if a conventional fender were secured in such a way as to be removable, it could not be readily adjusted or moved to other positions on the vehicle.

Thus, in order to produce a vehicle having variations wherein the fenders in different positions, it is conventionally necessary to produce unique fenders for each position. For example, if it were desired to operate a vehicle with the fenders at one height when traveling on sand, and at a different height when traveling on mud, two separate sets of fenders would have to be manufactured. To change fender positions after delivery of the vehicle, it would be necessary to remove the old fenders, and mount a second set of fenders in the new position. Furthermore, even if the fenders are not made to be removable after delivery, with such an arrangement it would be necessary for the vehicle's manufacturer to produce several different fender designs for each type of vehicle.

SUMMARY OF THE INVENTION

It is the purpose of the present invention to overcome these difficulties, thereby providing an improved vehicle fender that may be readily attached, removed, repositioned, and replaced. It is also the purpose of the present invention to provide a fender that is distinct from the remainder of the vehicle body.

An exemplary embodiment of a fender in accordance with the principles of the claimed invention includes a fender body. The fender also includes one or more mounting assemblies, as follows. The fender may include a first mounting assembly for removably engaging the fender body with a vehicle in a first position relative to the vehicle. The fender may include a second mounting assembly for removably engaging the fender body with the vehicle in a second position relative to the vehicle. The fender may include both the first and the second mounting assemblies described above. Finally, the fender may include a common mounting assembly for removably engaging the fender body with the vehicle in either the first or the second position.

The mounting assemblies may include a bracket disposed between the fender body and the vehicle. The first mounting assembly, second mounting assembly, and common mounting assembly may include a first bracket, a second bracket, and a common bracket respectively. Alternatively, the first and second mounting assemblies may include a common bracket that is used in both the first and second assemblies.

The mounting assemblies may include connectors for engaging the fender body with the vehicle. The first mounting assembly, second mounting assembly, and common mounting assembly may include first connectors, second connectors, and common connectors respectively. Alternatively, the first and second mounting assemblies may include common connectors that are used in both the first and second mounting assemblies.

The connectors may be quick release connectors. The connectors may be sacrificial break-away connectors, adapted to break more readily than the fender and/or the remainder of the mounting assembly.

The first and second positions of the fender body may be spaced apart vertically from one another.

An exemplary embodiment of a vehicle in accordance with the principles of the claimed invention includes the fender as described above.

The vehicle may include a first location for engaging the fender body when the fender body is in the first position, and a second location for engaging the fender body when the fender body is in the second position. One location may be on the vehicle's suspension, and one location may be on the vehicle's frame.

An exemplary embodiment of a kit for a vehicle fender in accordance with the principles of the claimed invention includes the fender body as described above. The kit also includes either the first mounting assembly and the second mounting assembly, or the common mounting assembly. The kit may also include instructions for engaging and/or disengaging the fender body in its various positions with the appropriate mounting assemblies.

An exemplary method for connecting a fender to a vehicle in accordance with the principles of the claimed invention includes removably engaging a fender body with the vehicle in one of at least a first position and a second position relative to a vehicle using a mounting assembly so as to dispose the fender body in the selected position.

The mounting assembly may include a first mounting assembly for removably engaging the fender body with a vehicle in a first position relative to the vehicle. Alternatively, the mounting may include a second mounting assembly for removably engaging the fender body with the vehicle in a second position relative to the vehicle. The mounting assembly may include the first mounting assembly and the second mounting assembly. As a further alternative, the mounting assembly may include a common mounting assembly for removably engaging the fender body with the vehicle in the first and second positions.

The mounting assemblies may include a bracket disposed between the fender body and the vehicle. The first mounting assembly, second mounting assembly, and common mounting assembly may include a first bracket, a second bracket, and a common bracket respectively. Alternatively, the first and second mounting assemblies may include a common bracket that is used in both the first and second assemblies.

The mounting assemblies may include connectors for engaging the fender body with the vehicle. The first mounting assembly, second mounting assembly, and common mounting assembly may include first connectors, second connectors, and common connectors respectively. Alternatively, the first and second mounting assemblies may include common connectors that are used in both the first and second mounting assemblies.

The connectors may be quick release connectors. The connectors may be sacrificial break-away connectors, adapted to break more readily than the fender and/or the remainder of the mounting assembly.

The first and second positions of the fender body may be spaced apart vertically from one another.

The method may include engaging the fender body at a first location on the vehicle to dispose the fender body in the first position, and engaging the fender body at a second location on the vehicle to dispose the fender body in the second position. One location may be on the vehicle's suspension, and one location may be on the vehicle's frame.

Before the fender body is engaged with the vehicle, the fender body may already be engaged with the vehicle in the first position. In the first position, the mounting assembly may be the first mounting assembly, the first and second assemblies, or the common mounting assembly. In this case, the method further includes disengaging the fender body from the vehicle so as to remove it from the first position relative to the vehicle. The fender is engaged to the vehicle with the mounting assembly so as to dispose the fender body in the second position relative to the vehicle. In the second position, the mounting assembly may be the second mounting assembly, the first and second assemblies, or the common mounting assembly. In this fashion, the fender is moved from the first position to the second position.

Before the fender body is engaged with the vehicle, an original fender body may already be engaged with the vehicle. In this case, the method further includes disengaging the original fender body from the vehicle so as to remove the original fender body from its position, and engaging the vehicle and the fender body with the mounting assembly so as to dispose the fender body in that position. In this fashion, the fender body replaces the original fender body.

BRIEF DESCRIPTION OF THE DRAWINGS

Like reference numbers generally indicate corresponding elements in the figures.

DETAILED DESCRIPTION OF THE PREFERRED EMBODIMENT

Figure 1:
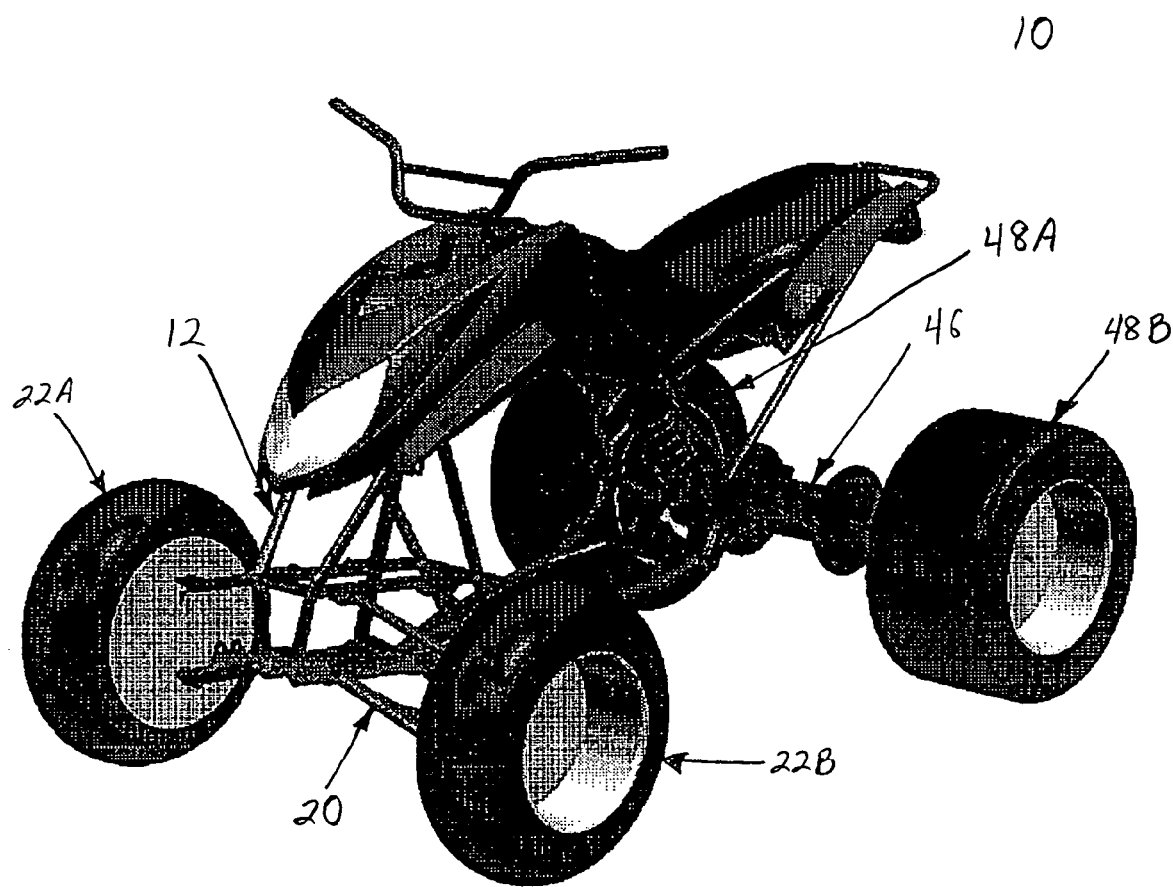
FIG. 1 is a perspective illustration of a portion of an exemplary vehicle without fenders.

FIG. 1 shows an exemplary vehicle 10. The vehicle 10 includes a frame 12, front wheels 22A and 22B, rear wheels 48A and 48B, and front and rear suspension 20 and 46. No fenders are illustrated thereon. FIG. 1 thus shows a neutral reference configuration, for comparison with FIGS. 2–5.

However, FIG. 1 is not only a neutral reference.

In conventional vehicles that have fenders thereon, those fenders cannot readily be removed. In contrast, as described below, the present invention facilitates the addition, removal, replacement, and movement of fenders on a vehicle. Thus, it may be difficult or impossible to configure a conventional vehicle so that it is as shown in FIG. 1. For example, the fenders of such a conventional vehicle may not be removable. However, a vehicle with fenders in accordance with the principles of the present invention may be readily configured as shown in FIG. 1. Thus, FIG. 1 represents one of several configurations possible for an exemplary vehicle with fenders in accordance with the principles of the present invention, in particular a configuration that may not be readily achievable on a conventional vehicle. As such, FIG. 1 is not presented as prior art.

Figure 2:
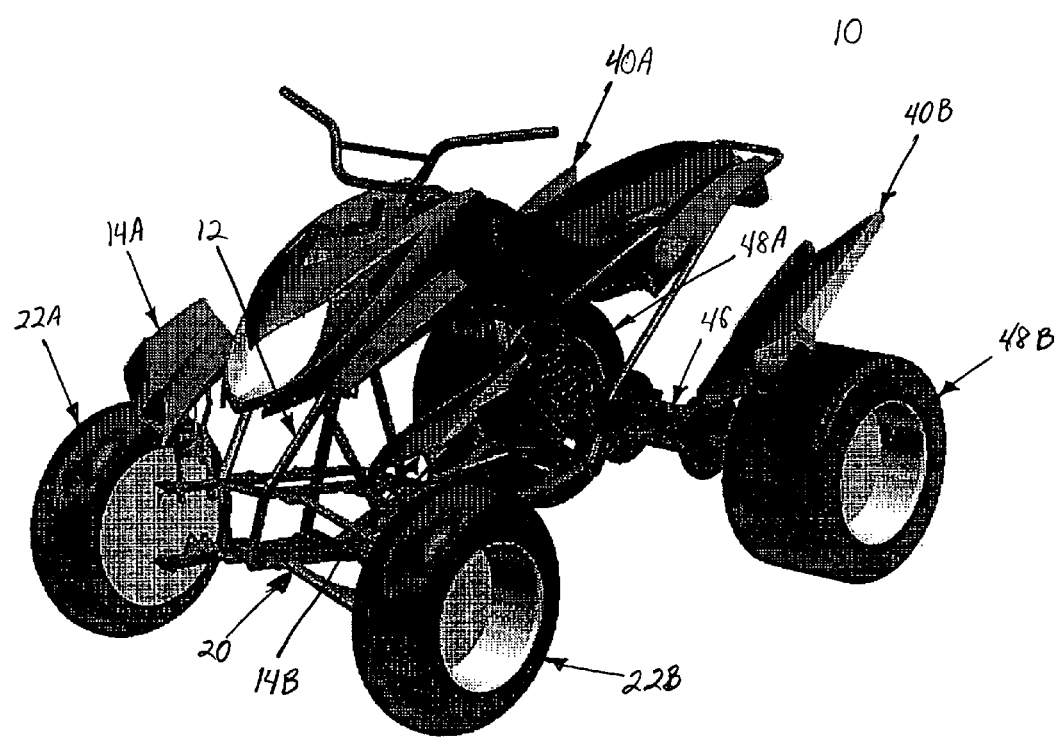
FIG. 2 is a perspective illustration of the vehicle of FIG. 1, with fenders in accordance with the principles of the present invention, shown with front and rear fenders in a low position.

FIG. 2 shows the vehicle of FIG. 1 with front fender bodies 14A and 14B and rear fender bodies 40A and 40B. As illustrated, all of the fender bodies 14A, 14B, 40A, and 40B are relatively close to their respective wheels 22A, 22B, 48A, and 48B. This arrangement is referred to herein as the low position.

Figure 3:
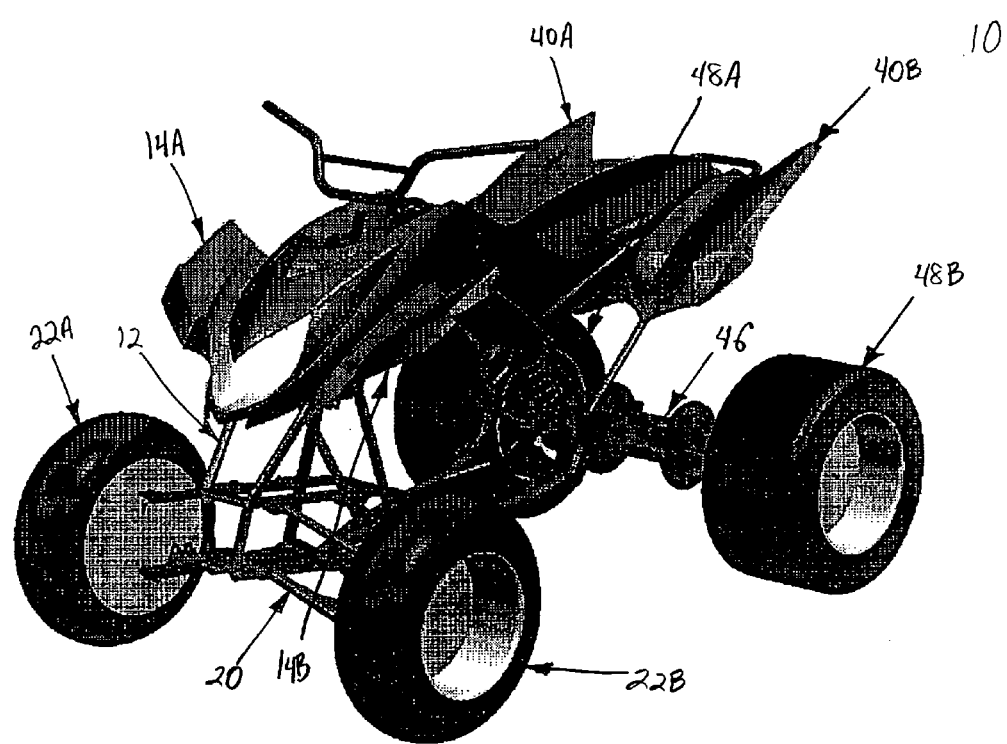
FIG. 3 is a perspective illustration of the vehicle of FIG. 1, shown with the front and rear fenders in a high position.

FIG. 3 shows the vehicle of FIG. 1 with the fender bodies 14A, 14B, 40A, and 40B relatively distant from their respective wheels 22A, 22B, 48A, and 48B. This arrangement is referred to herein as the high position.

Thus, as shown in FIGS. 2 and 3, the fender bodies 14A, 14B, 40A, and 40B may be connected to the vehicle 10 such that they are disposed in different positions. Although the fender bodies 14A, 14B, 40A, and 40B are shown in two specific positions, high and low, this is exemplary only. More generally, the fender bodies 14A, 14B, 40A, and 40B may be described as being movable between first and second positions, without specifying the particular positions.

For example, although the high and low positions shown differ from one another in terms of the height of the fender bodies 14A, 14B, 40A, and 40B above their respective wheels 22A, 22B, 48A, and 48B, this is exemplary only. For example, for certain embodiments it may be suitable to facilitate positioning of the 14A, 14B, 40A, and 40B at different lateral positions, at different positions along the length of the vehicle, at different angles, etc.

Furthermore, although for simplicity the fender bodies 14A, 14B, 40A, and 40B are described and illustrated herein as being movable between exactly two positions, this is exemplary only. In other embodiments, the fender bodies 14A, 14B, 40A, and 40B may be adjustable between three or more positions.

As illustrated in FIGS. 2 and 3, when the front fender bodies 14A and 14B are in their low position, the front fender bodies 14A and 14B are engaged with the front suspension 20 of the vehicle 10. Similarly, when the rear fender bodies 40A and 40B are in their low position, the rear fender bodies 40A and 40B are engaged with the rear suspension 46 of the vehicle 10.

It is noted that when fender bodies 14A, 14B, 40A, 40B are to be engaged with the suspensions 20, 46 of a vehicle 10, they should be engaged in such a fashion as not to interfere with the operation of the suspensions 20, 46. That is, the fender bodies 14A, 14B, 40A, 40B should not inhibit the necessary movement, support functions, shock absorption, etc. of the suspensions 20, 46 due to their engagement therewith.

The precise manner in which the fender bodies 14A, 14B, 40A, 40B may advantageously be engaged without interfering with the suspensions 20, 46 of a given embodiment of a vehicle 10 will vary from depending upon the specific arrangement of the vehicle 10 in general, and the fender bodies 14A, 14B, 40A, 40B and suspensions 20, 46 in particular. For example, for certain embodiments, the fender bodies 14A, 14B, 40A, 40B may be clamped or similarly mounted to the respective suspension arms of the suspensions 20, 46. However, such an arrangement is exemplary only, and other arrangements may be equally suitable.

In addition, when the front fender bodies 14A and 14B are in their high position, the front fender bodies 14A and 14B are engaged with the vehicle frame 12. Similarly, when the rear fender bodies 40A and 40B are in their high position, the rear fender bodies 40A and 40B are engaged with the vehicle frame 12.

However, such arrangements are exemplary only. For certain embodiments, it may be equally suitable to dispose the fender bodies 14A, 14B, 40A, and 40B at other locations instead of or in addition to those shown.

In addition, the fender bodies 14A, 14B, 40A, and 40B may be engaged with the vehicle at more than one location. For example, even when the fender bodies 14A, 14B, 40A, and 40B are engaged with the vehicle frame 12 when they are in their respective high positions as described above, they may also be engaged with the vehicle body 11. It is noted that the arrangements shown in FIGS. 3–5 do not exclude such engagement with the vehicle body 11, though details of such engagement may not be readily visible therein. However, engagement of the fender bodies 14A, 14B, 40A, and 40B with the vehicle body 11 is described and illustrated elsewhere herein.

Furthermore, as described below, in certain embodiments it may be possible to move the fender bodies 14A, 14B, 40A, and 40B from one position to another without changing the location on the vehicle 10 at which they engage the vehicle 10, e.g. by using brackets of different shapes and/or sizes.

Figure 4:
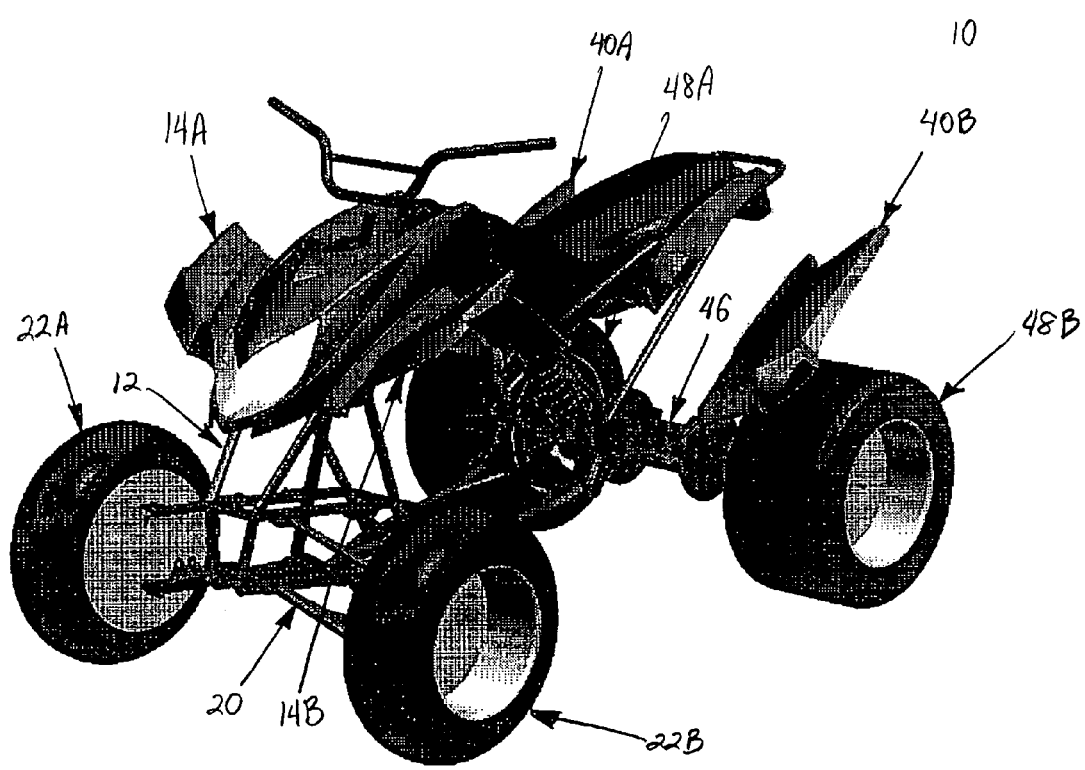
FIG. 4 is a perspective illustration of the vehicle of FIG. 1, shown with the front fenders in a high position and the rear fenders in a low position.
Figure 5:
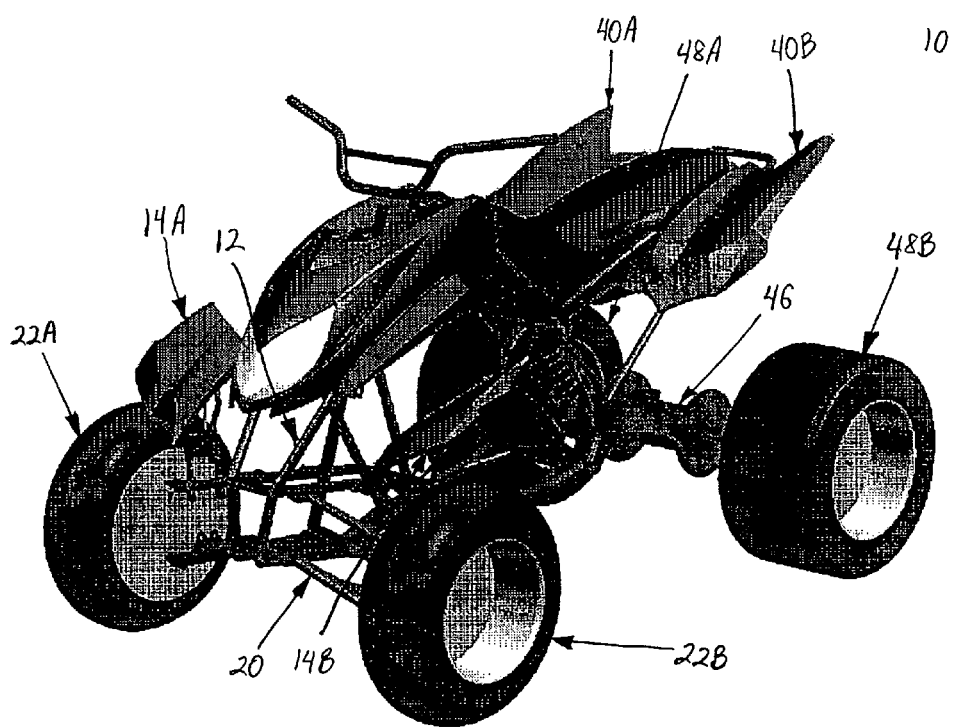
FIG. 5 is a perspective illustration of the vehicle of FIG. 1, shown with the front fenders in a low position and the rear fenders in a high position.

FIG. 4 shows the vehicle of FIG. 1 with front fender bodies 14A and 14B in their high position, and rear fender bodies 40A and 40B in their low position. Contrariwise, FIG. 5 shows the vehicle of FIG. 1 with front fender bodies 14A and 14B in their low position, and rear fender bodies 40A and 40B in their high position. As may be seen, it is not necessary for all of the fender bodies 14A, 14B, 40A, and 40B to be disposed in the same position.

As may be seen from FIGS. 2–5, the fender bodies 14A, 14B, 40A, and 40B, being separate from the vehicle body as a whole, conveniently may be constructed as individual pieces.

In addition, since the fender bodies 14A, 14B, 40A, and 40B are not required to be integral with the vehicle body as a whole, the fender bodies 14A, 14B, 40A, and 40B may be made of different material than the vehicle body. Indeed, the fender bodies 14A, 14B, 40A, and 40B may be made of different materials from one another, as well. Likewise, the fender bodies 14A, 14B, 40A, and 40B may have different colors, textures, rigidity, thickness, etc. among themselves and as compared with the vehicle body.

As described above, FIGS. 1–5 are perspective views of an exemplary vehicle 10 with fender bodies 14A, 14B, 40A, and 40B arranged in different positions (high and low). FIGS. 6–10 show a similar vehicle 10 and its associated fender bodies 14A and 14B in a simplified schematic form. This is done to show clearly an exemplary arrangement by which the fender bodies 14A and 14B may be made to be movable between two or more positions.

Figure 6:
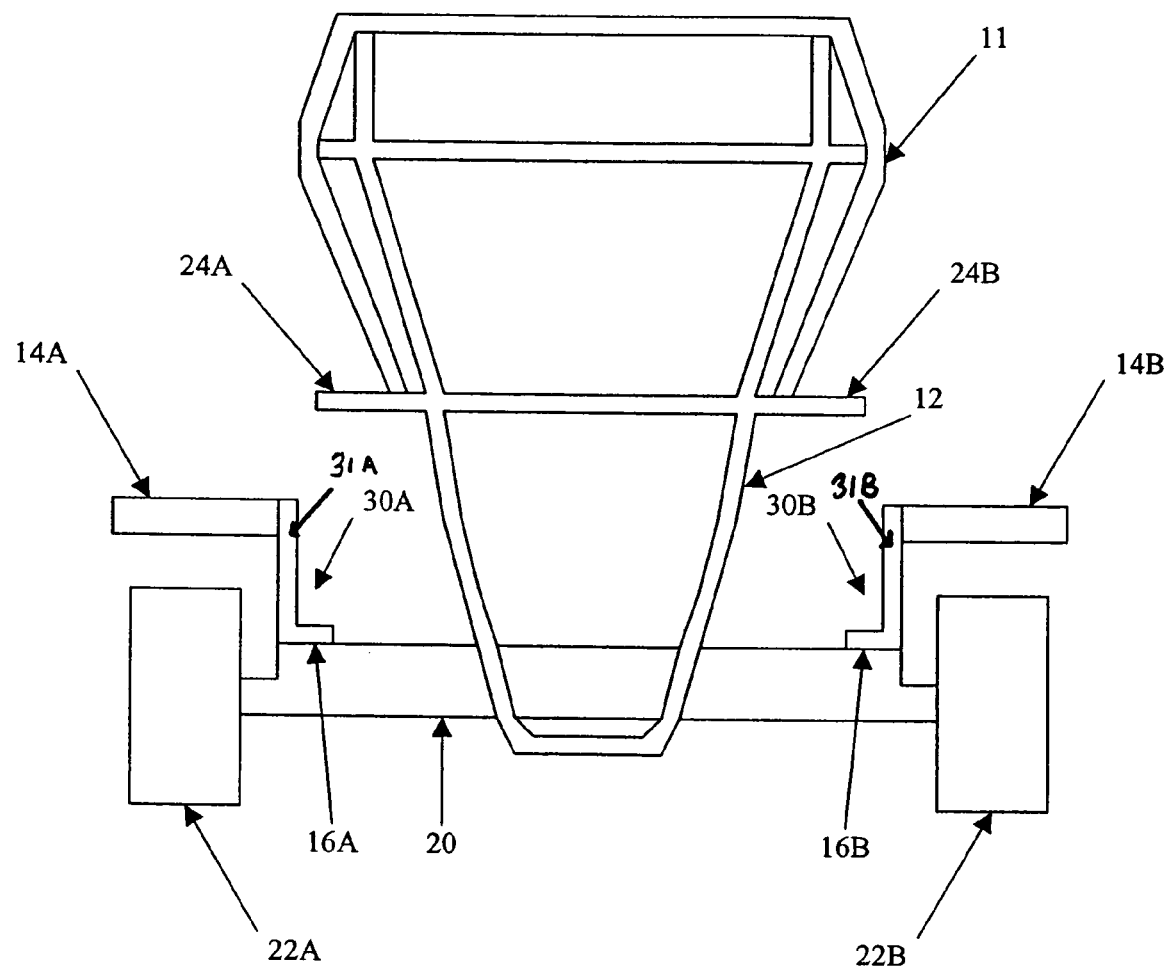
FIG. 6 is a schematic cross section of a front portion of an exemplary vehicle, with front fenders in a low position.
Figure 7:
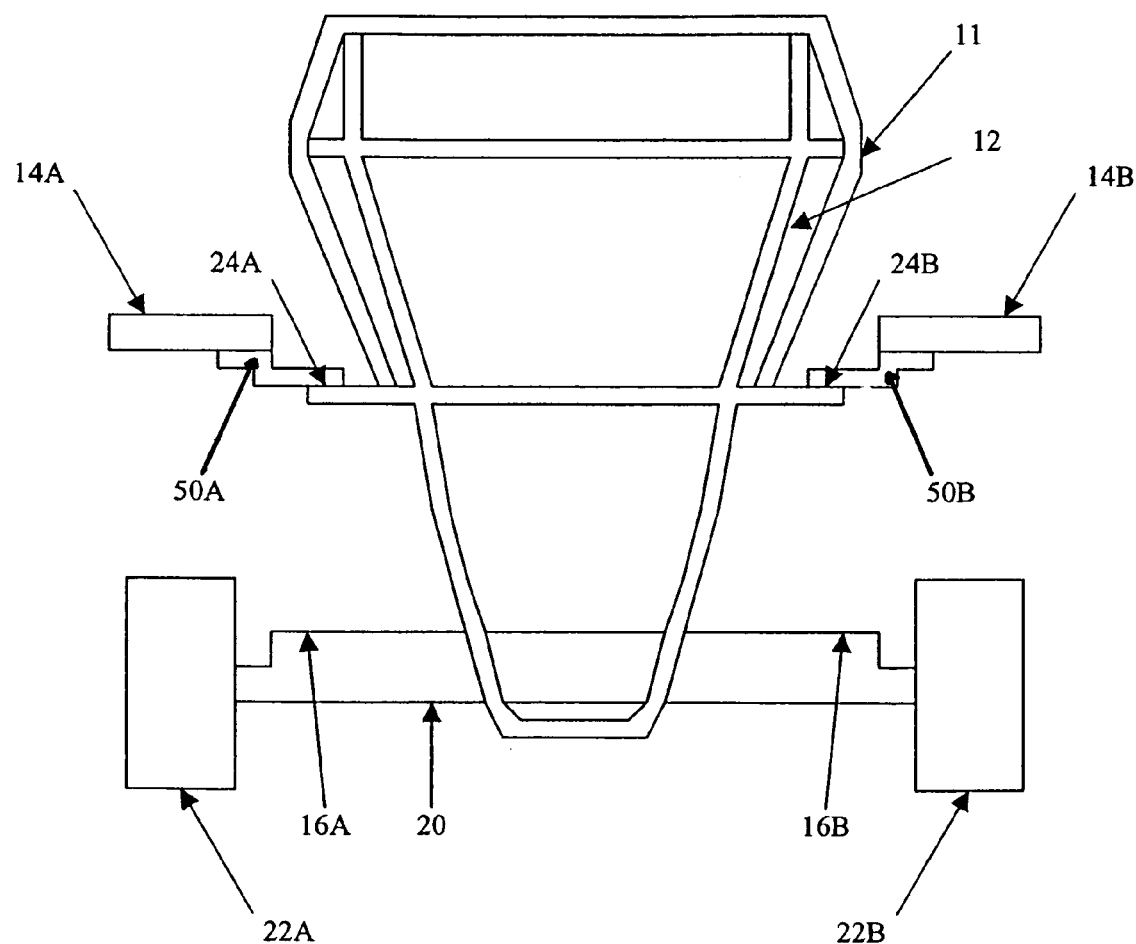
FIG. 7 is a schematic cross section of the vehicle in FIG. 6 with front fenders in a high position.

One way in which the fender bodies 14A, 14B, 40A, and 40B maybe moved from one position to another on the vehicle 10 is by moving the point at which they engage the vehicle 10 from one location to another, as may be seen by a comparison of FIGS. 6 and 7.

It is noted that the terms "location" and "position" are not used interchangeably herein.

As used herein, "location" refers to a point or points on the vehicle 10 at which the fender bodies 14A, 14B, 40A, and 40B may be engaged, either directly or indirectly (e.g. via a bracket, as described below). In the exemplary embodiment described herein, there are first locations 16A and 16B and second locations 24A and 24B for the front fender bodies 14A and 14B.

In contrast, the term "position" is used herein to describe a point or points at which the fender bodies 14A, 14B, 40A, and 40B may be disposed. For example, as illustrated in FIGS. 1–5 each of the fender bodies 14A, 14B, 40A, and 40B may be arranged in either a high position or a low position.

Thus, position refers to where the fender bodies 14A, 14B, 40A, and 40B are, and location refers to where on the vehicle 10 the fender bodies 14A, 14B, 40A, and 40B are attached.

However, although for some embodiments a change in the position of the fender bodies 14A, 14B, 40A, and 40B may be accomplished by changing the location at which the fender bodies 14A, 14B, 40A, and 40B engage the vehicle 10, this is exemplary only. Other arrangements, including but not limited to those described below, may be equally suitable.

Returning to FIG. 6, a cross-section of a vehicle 10 is shown therein. The cross section is taken across the front portion of the vehicle 10, so as to the show front fenders 30A and 30B. Each front fender 30A, 30B includes a front fender body 14A, 14B, and at least one mounting assembly as described in greater detail below.

Although only the front fenders 30A, 30B, including the front fender bodies 14A, 14B and their mounting assemblies, are shown in FIGS. 6–10, the rear fenders and their respective fender bodies 40A and 40B may be arranged in a similar fashion, and the following discussion as to the arrangement of the front fender bodies 14A and 14B therefore may be applied similarly to the rear fender bodies 40A and 40B.

As may be seen in FIG. 6, the vehicle 10 includes low mounting locations 16A and 16B at which the fender bodies 14A and 14B may engage the vehicle 10. The vehicle 10 also includes high mounting locations 24A and 24B at which the fender bodies 14A and 14B may engage the vehicle 10.

In FIG. 6, the fender bodies 14A and 14B are engaged with the vehicle 10 at the low mounting locations 16A and 16B. As may be seen, the front fender bodies 14A and 14B are disposed relatively close to their respective wheels 22A and 22B. Thus, their positions correspond to the low position shown in FIGS. 2 and 5.

In the exemplary arrangement shown in FIG. 6, a low mounting assembly 31A, 31B is disposed between each of the fender bodies 14A, 14B and its respective first location 16A, 16B. The low mounting assemblies 31A, 31B engage the fender bodies 14A, 14B and the low mounting locations 16A, 16B, such that the fender bodies 14A, 14B engage the low mounting locations 16A, 16B thereby, and the fender bodies 14A and 14B are in their low positions.

FIG. 7 shows the vehicle of FIG. 6, with the fender bodies 14A and 14B engaged with the vehicle 10 at the high mounting locations 24A and 24B. In this configuration, the fender bodies 14A and 14B are disposed relatively far above their respective wheels 22A and 22B, so that their positions correspond to the high position shown in FIGS. 3 and 4.

In the arrangement shown in FIG. 7, a high mounting assembly 50A, 50B is disposed between each of the fender bodies 14A, 14B and its respective high mounting location 24A, 24B. The arrangement of the high mounting assemblies 50A and 50B is similar to that of low mounting assemblies 31A and 31B. That is, the high mounting assemblies 50A, 50B engage the fender bodies 14A, 14B and the high mounting locations 24A, 24B, such that the fender bodies 14A, 14B engage the high mounting locations 24A, 24B thereby, and the fender bodies 14A, 14B are disposed in their high positions.

Thus in the arrangement shown in FIGS. 6 and 7, the fender bodies 14A and 14B use one type of mounting assembly 31A, 31B for the low position, and another type of mounting assembly 50A, 50B for the high position.

Figure 12:
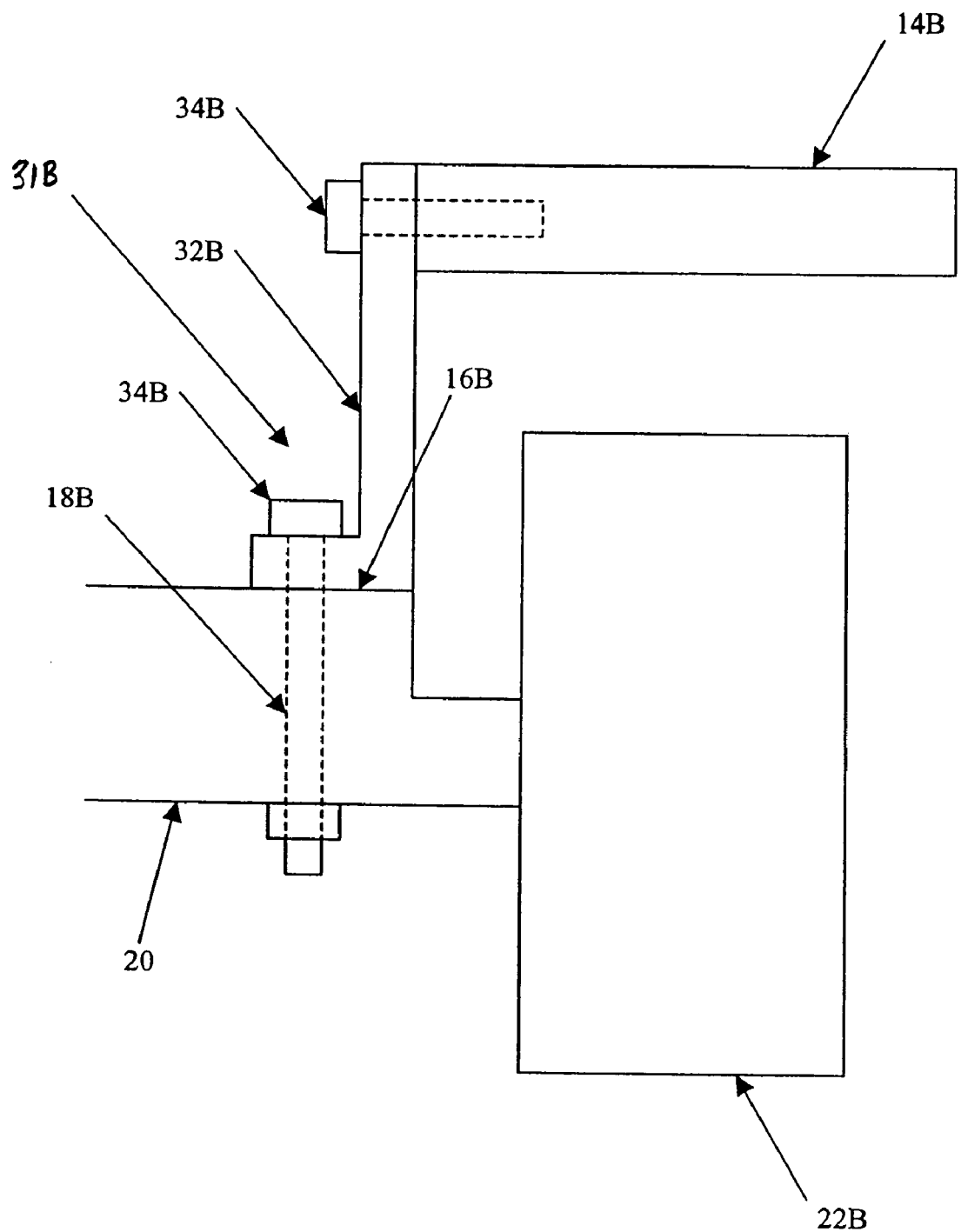
FIG. 12 is an enlarged view of one of the fenders in FIG. 6.
Figure 13:
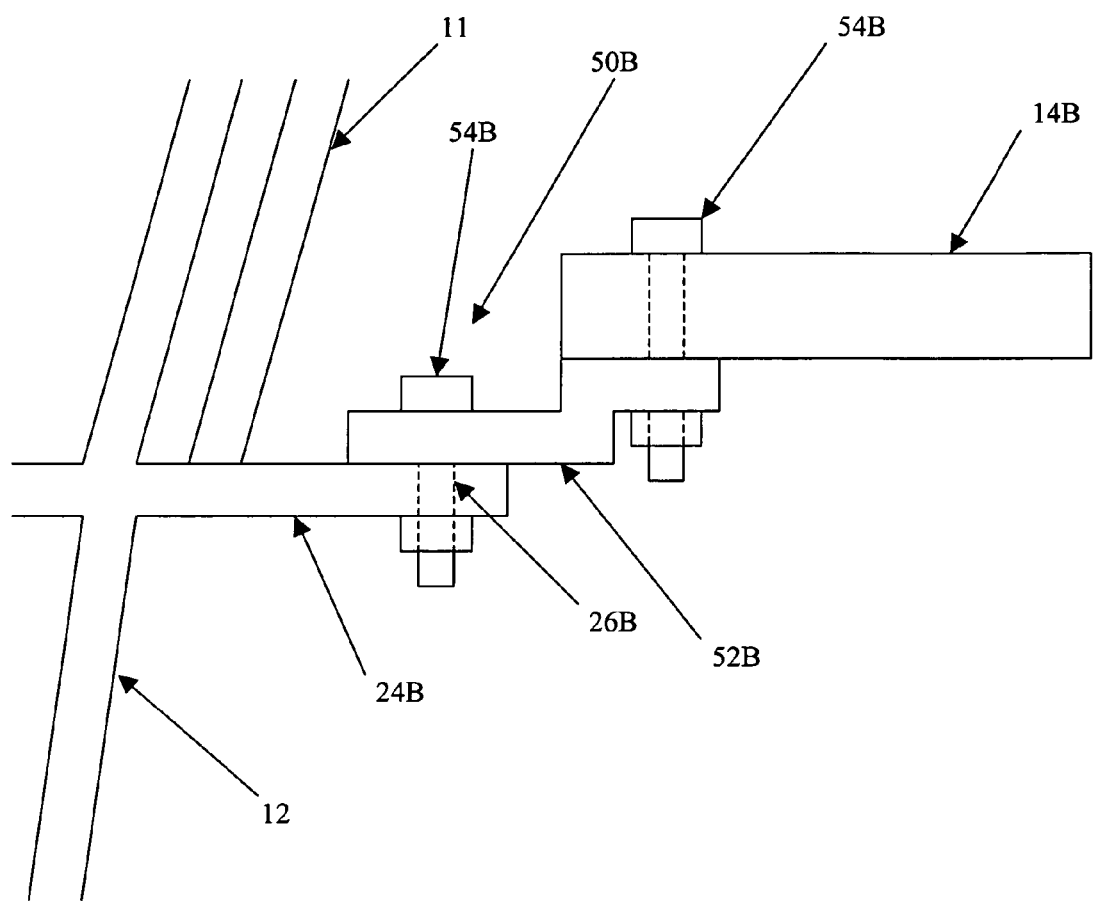
FIG. 13 is an enlarged view of one of the fenders in FIG. 7.

FIGS. 12 and 13 show greater detail regarding the engagement of the fender bodies 14A (not shown), 14B as illustrated in FIGS. 6 and 7.

As may be seen from FIG. 12, in the exemplary embodiment shown the low mounting assembly 31B includes a low bracket 32B disposed between the fender body 14B and the low mounting location 16B. Thus, in the low position the fender body 14B is engaged with the vehicle 10 via the low bracket 32B.

Similarly, as may be seen from FIG. 13, the high mounting assembly 50B includes a high bracket 52B disposed between the fender body 14B and the high mounting location 24B. Thus, in the high position the fender body 14B is engaged with the vehicle 10 via the high bracket 52B.

Returning to FIG. 12, the exemplary low mounting assembly 31B therein also includes low connectors 34B, both for connecting the fender body 14B with the low bracket 32B and for connecting the low bracket 32B to the vehicle 10 at the low mounting location 16B. Thus, in the low position the fender body 14B is engaged with the vehicle 10 using the low connectors 34B.

Similarly, the high mounting assembly 50B shown in FIG. 13 also includes high connectors 54B, both for connecting the fender body 14B with the high bracket 52B and for connecting the high bracket 52B to the vehicle 10 at the high mounting location 24B. Thus, in the high position the fender body 14B is engaged with the vehicle 10 using the high connectors 54B.

In the arrangement shown in FIGS. 6 and 7, one or both of the fender bodies 14A, 14B can be moved from the low position to the high position as follows. The fender bodies 14A, 14B are disengaged from the low mounting locations 16A, 16B by removing the low mounting assemblies 31A, 31B from both the fender bodies 14A, 14B and the low mounting locations 16A, 16B. The fender bodies 14A, 14B are then engaged with the high mounting locations 24A, 24B using the high mounting assemblies 50A, 50B.

More specifically, as may be understood by a comparison of FIGS. 12 and 13, fender body 14B can be moved from its low position to its high position by disengaging the low connectors 34B, disengaging the low bracket 32B from the low position 16B, engaging the high bracket 54B in the high position 24B, and engaging the high connectors 54B.

Similarly, the fender body 14B can be moved from the high position to the low position by reversing the process described above.

In addition, a fender body 14B in the low position can be replaced by disengaging the low connectors 34B, disengaging the low bracket 32B from the fender body 14B, engaging a new fender body 14B with the low bracket 32B, and engaging the low connectors 34B. A similar process may be used to replace a fender body 14B in the high position.

It will also be apparent from the preceding description that a fender body 14B may be installed by following a process similar to that described above, without the need for first removing a fender body and/or mounting assembly.

As shown in FIGS. 12 and 13, the connectors 34B, 54B are bolts and/or nuts disposed in holes in the fender body 14B and/or brackets 32B, 52B. However, this is exemplary only. Other connectors may be equally suitable, including but not limited to clamps, spring clips, locking pins, etc. In particular, connectors that do not require holes in the fender body 14B and/or brackets 32B, 52B may be suitable for some embodiments.

The connectors 34B, 54B may be quick release connectors. For example, the connectors 34B, 54B may be sacrificial break-away connectors, such that some portion of the connectors 34B, 54B bends or breaks more readily than the fender body 14A, 14B and/or the remainder of the mounting assembly 31B, 50B. With such an arrangement, potentially damaging impacts to the fenders or their respective mounting assemblies, i.e. due to contact with trees, brush, etc., may be avoided, since the connectors will break first. Thereby, repairs to or replacement of the mounting assemblies and/or the fenders as a whole may be avoided.

Also as shown in FIGS. 12 and 13, the vehicle 10 may include structures on the vehicle 10 itself for facilitating the engagement of the fender body 14B therewith, referred to herein as supports 18B, 26B. In FIG. 12, a low support 18B is provided in the form of a hole drilled into the suspension 20 at the low mounting location 16B for receiving a low connector 34B therein. Similarly, a high support 26B is provided in the form of a hole drilled into the frame 12 at the high mounting location 24B for receiving a high connector 54B therein.

However, the supports 18B, 26B as shown are exemplary only. Other supports may be equally suitable, including but not limited to pins extending from the vehicle, reinforced areas on the vehicle, etc. In particular, supports that do not require holes in the vehicle 10 may be suitable for some embodiments. Furthermore, supports 18B, 26B may not be present at all in some embodiments.

In addition, the overall arrangement shown in FIGS. 6 and 7, and shown in greater detail in FIGS. 12 and 13, is exemplary only.

In FIGS. 6, 7, 12, and 13, the fender body 14B is disposed in either the low or the high position by using two different mounting assemblies 31B and 50B. Each of the mounting assemblies 31B, 50B has a unique bracket 32B, 52B and a unique set of connectors 34B, 54B. Each mounting assembly 31B, 50B is completely removed from the fender body 14B when the fender body 14B is arranged at a position other than the one for which the respective mounting assembly 31B, 50B is used. Furthermore, each of the mounting assemblies 31B, 50B engages the fender body 14B with the vehicle 10 at a different location 16B, 24B.

However, other arrangements may be equally suitable. For example, a common mounting assembly 70B may be used to engage the fender bodies 14A (not shown), 14B at both their low and high positions.

Alternatively, the mounting assemblies 31B, 50B may include one or more components that are common to both, and that are used engage the fender bodies 14A, 14B at both their low and high positions.

Additionally, the fender bodies 14A, 14B may include two complete mounting assemblies 31B, 50B, one for their respective high positions and one for their low positions, that both remain in place regardless of which position the fender bodies 14A, 14B are in, even if only one at a time is used to engage the fender bodies 14A, 14B with the vehicle 10 at any given time.

These arrangements are described more fully below.

As noted previously, in another embodiment in accordance with the principles of the present invention, each fender 30A, 30B may include a common mounting assembly 70A, 70B for engaging the fender bodies 14A, 14B with the vehicle 10 in both the low and the high positions.

Figure 8:
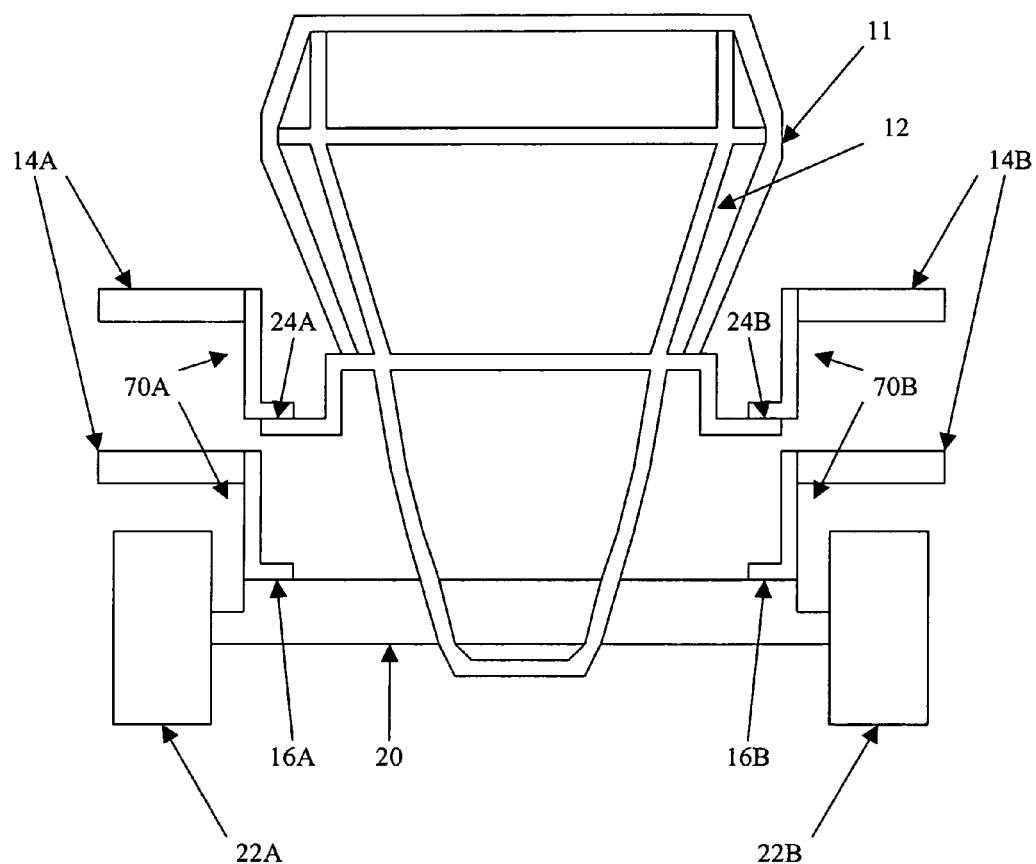
FIG. 8 is a schematic cross section of an exemplary vehicle showing front fenders in high and low positions with a common mounting assembly.

FIG. 8 shows a cross-section of a vehicle 10, taken across the front portion of the vehicle 10 so as to show the front fenders 30A and 30B. Each of the front fender 30A, 30B includes a front fender body 14A, 14B. As may be seen, the vehicle 10 includes low mounting locations 16A and 16B and high mounting locations 24A and 24B at which the fender bodies 14A and 14B may be engaged with the vehicle 10. In the embodiment shown, the low mounting locations 16A and 16B are similar to those in FIGS. 6 and 7. However, the high mounting locations 24A and 24B are arranged differently, being defined at the ends of L-shaped arms on either side of the frame 12.

For comparison purposes, the vehicle 10 of FIG. 8 is shown with fender bodies 14A, 14B located in both the low and the high positions. However, in practice the vehicle 10 will not necessarily have fender bodies 14A, 14B at both the low and the high positions at any given time.

As may be seen, identical common mounting assemblies 70A, 70B are used to engage the fender bodies 14A, 14B with the vehicle 10 in both the low and the high positions. With the common mounting assemblies 70A, 70B disposed between the fender bodies 14A, 14B and their respective low mounting locations 16A, 16B, the fender bodies 14A, 14B are in their low positions. With the same common mounting assemblies 70A, 70B disposed between the fender bodies 14A, 14B and their high mounting locations 24A, 24B, the fender bodies 14A, 14B are in their high positions.

Figure 14:
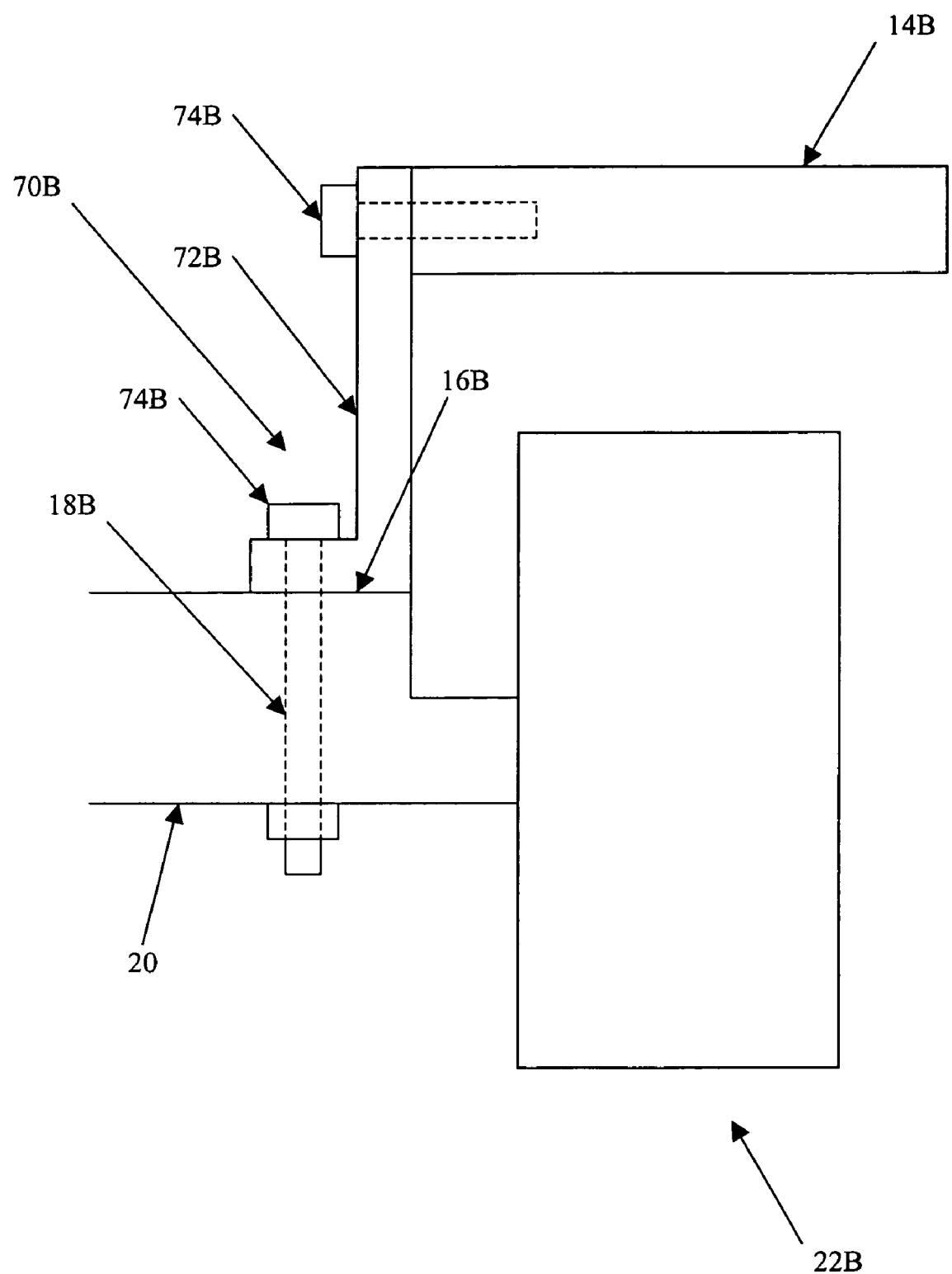
FIG. 14 is an enlarged view of one of the fenders in FIG. 8.
Figure 15:
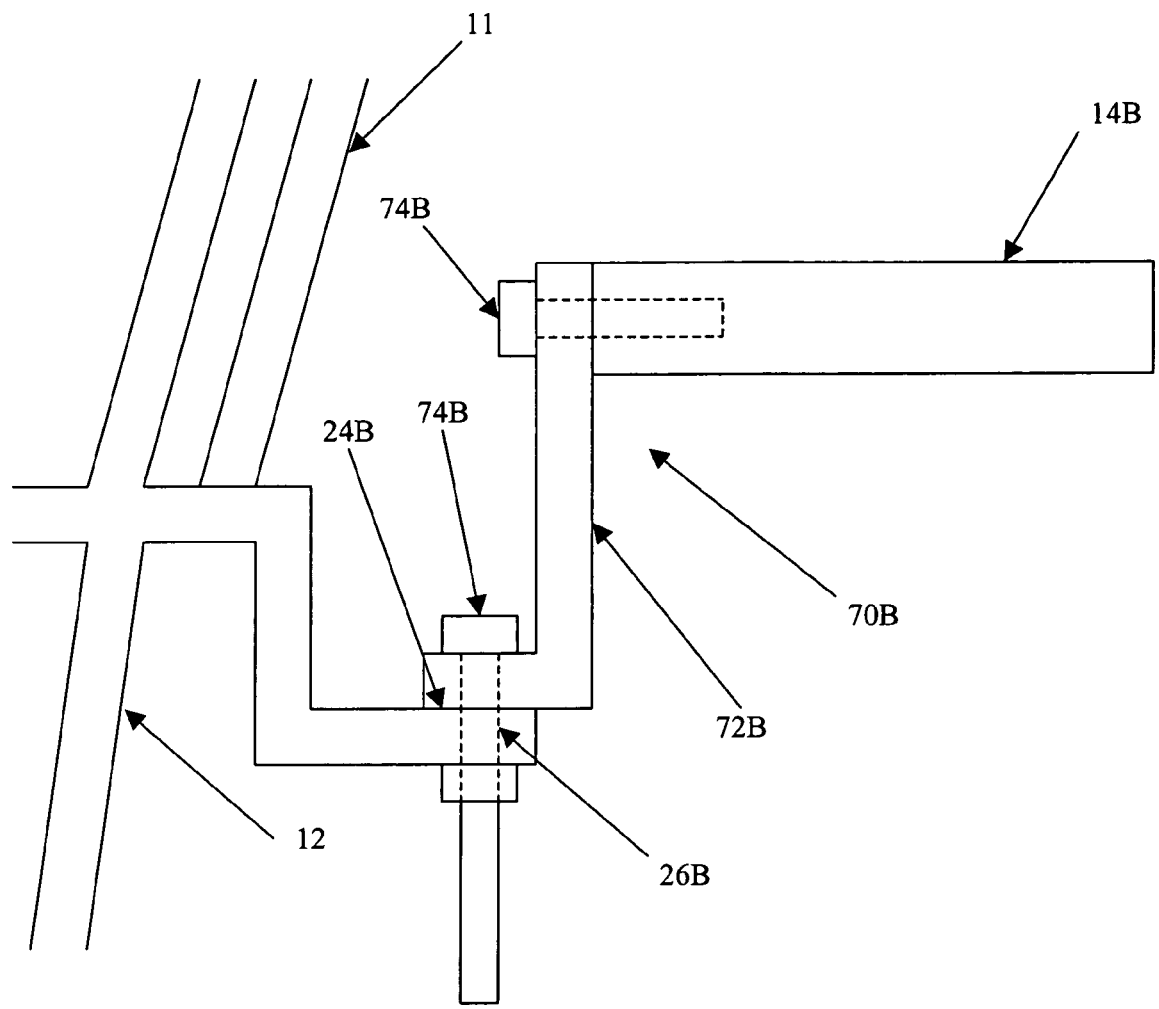
FIG. 15 is an enlarged view of another of the fenders in FIG. 8.

FIGS. 14 and 15 show greater detail regarding the engagement of the fender bodies 14A, 14B as illustrated in FIG. 8.

FIG. 14 shows greater detail regarding the engagement of the fender bodies 14A (not shown), 14B with the vehicle 10 in their low positions as illustrated in FIG. 8. As shown, the common mounting assembly 70B includes a common bracket 72B disposed between the fender body 14B and the low mounting location 16B. Thus, in the low position the fender body 14B is engaged with the vehicle 10 via the common bracket 72B.

Similarly, FIG. 15 shows details of the engagement of the fender bodies 14A (not shown), 14B with the vehicle 10 in their low positions as illustrated in FIG. 8.

The same common mounting assembly 70B again includes a common bracket 72B disposed between the fender body 14B and the high mounting location 24B. Thus, in the high position the fender body 14B also is engaged with the vehicle 10 via the same common bracket 72B as in the low position.

Returning to FIG. 14, the exemplary common mounting assembly 70B therein also includes common connectors 74B, both for connecting the fender body 14B with the common bracket 72B and for connecting the common bracket 72B to the vehicle 10 at the low mounting location 16B. Thus, in the low position the fender body 14B is engaged with the vehicle 10 using the common connectors 74B.

Similarly, the same common mounting assembly 70B shown in FIG. 15 also includes the same common connectors 74B, both for connecting the fender body 14B with the common bracket 72B and for connecting the common bracket 72B to the vehicle 10 at the high mounting location 24B. Thus, in the high position the fender body 14B is engaged with the vehicle 10 using the same common connectors 74B as in the low position.

In the arrangement shown in FIG. 8, one or both of the fender bodies 14A, 14B can be moved from the low position to the high position as follows. The fender bodies 14A, 14B are disengaged from the low mounting locations 16A, 16B by removing the common mounting assemblies 70A, 70B from both the fender bodies 14A, 14B and the low mounting locations 16A, 16B. The fender bodies 14A, 14B are then engaged with the high mounting locations 24A, 24B using the same common mounting assemblies 70A, 70B.

More specifically, as may be understood by a comparison of FIGS. 14 and 15, fender body 14B can be moved from its low position to its high position by disengaging the common connectors 74B, moving the common bracket 72B from the low position 16B to the high position 24B, and engaging the common connectors 74B.

Likewise, a fender body 14B similarly may be replaced or installed, as desired.

As noted previously, in another embodiment in accordance with the principles of the present invention, each fender 14A, 14B may use a low mounting assembly 31A, 31B for engaging the fender bodies 14A, 14B with the vehicle 10 in the low position, and a different high mounting assembly 50A, 50B for engaging the fender bodies 14A, 14B with the vehicle 10 in the high position. However, it is not necessary for the low and high mounting assemblies 31A, 31B and 50A, 50B to be completely unique. That is, some elements may be common to both the low mounting assemblies 31A, 31B and the high mounting assemblies 50A, 50B.

Figure 9:
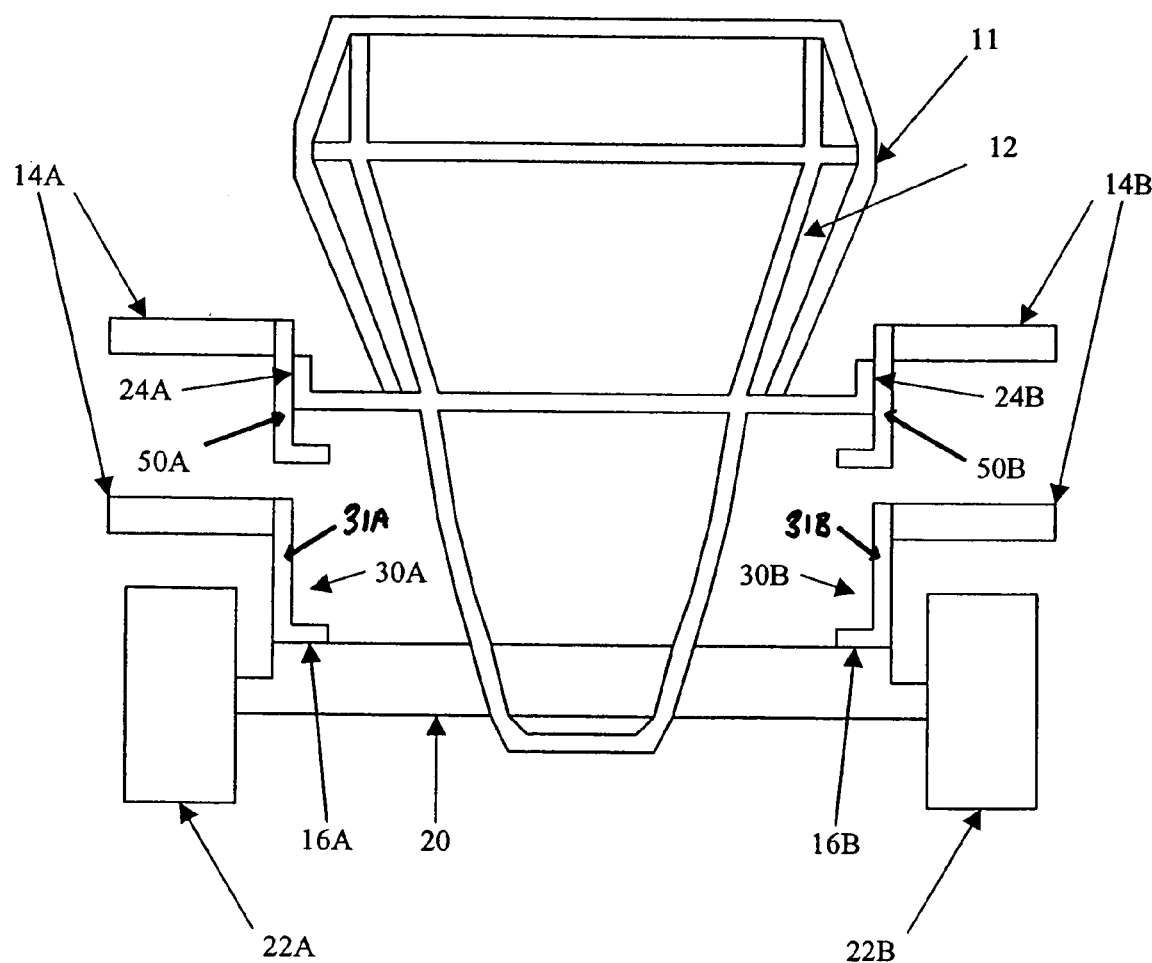
FIG. 9 is a schematic cross section of an exemplary vehicle showing front fenders in high and low positions with a high and low mounting assemblies having a common bracket.

FIG. 9 shows a cross-section of a vehicle 10, taken across the front portion of the vehicle 10 so as to show the front fenders 30A and 30B and their fender bodies 14A and 14B. As may be seen, the vehicle 10 includes low mounting locations 16A and 16B and high mounting locations 24A and 24B at which the fender bodies 14A and 14B may engage the vehicle 10. For comparison purposes, the vehicle 10 of FIG. 9 is shown with fender bodies 14A, 14B located in both the low and the high positions.

As in FIGS. 6 and 7, in FIG. 9 a low mounting assembly 31A, 31B is used to engage each of the fender bodies 14A, 14B with the vehicle 10 in the low position. Likewise, a high mounting assembly 50A, 50B is used to engage each of the fender bodies 14A, 14B with the vehicle 10 in the high position.

Figure 16:
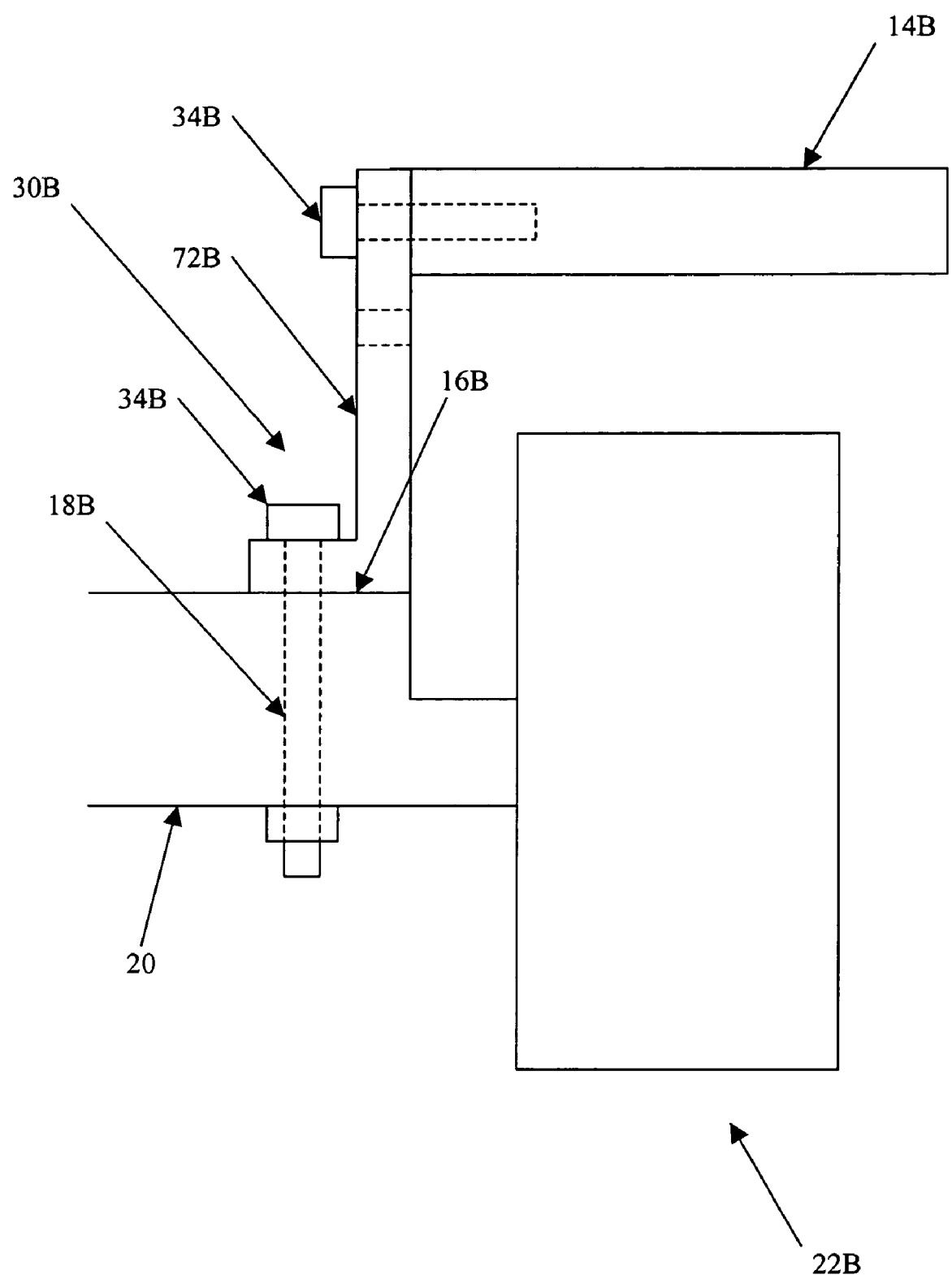
FIG. 16 is an enlarged view of one of the fenders in FIG. 9.
Figure 17:
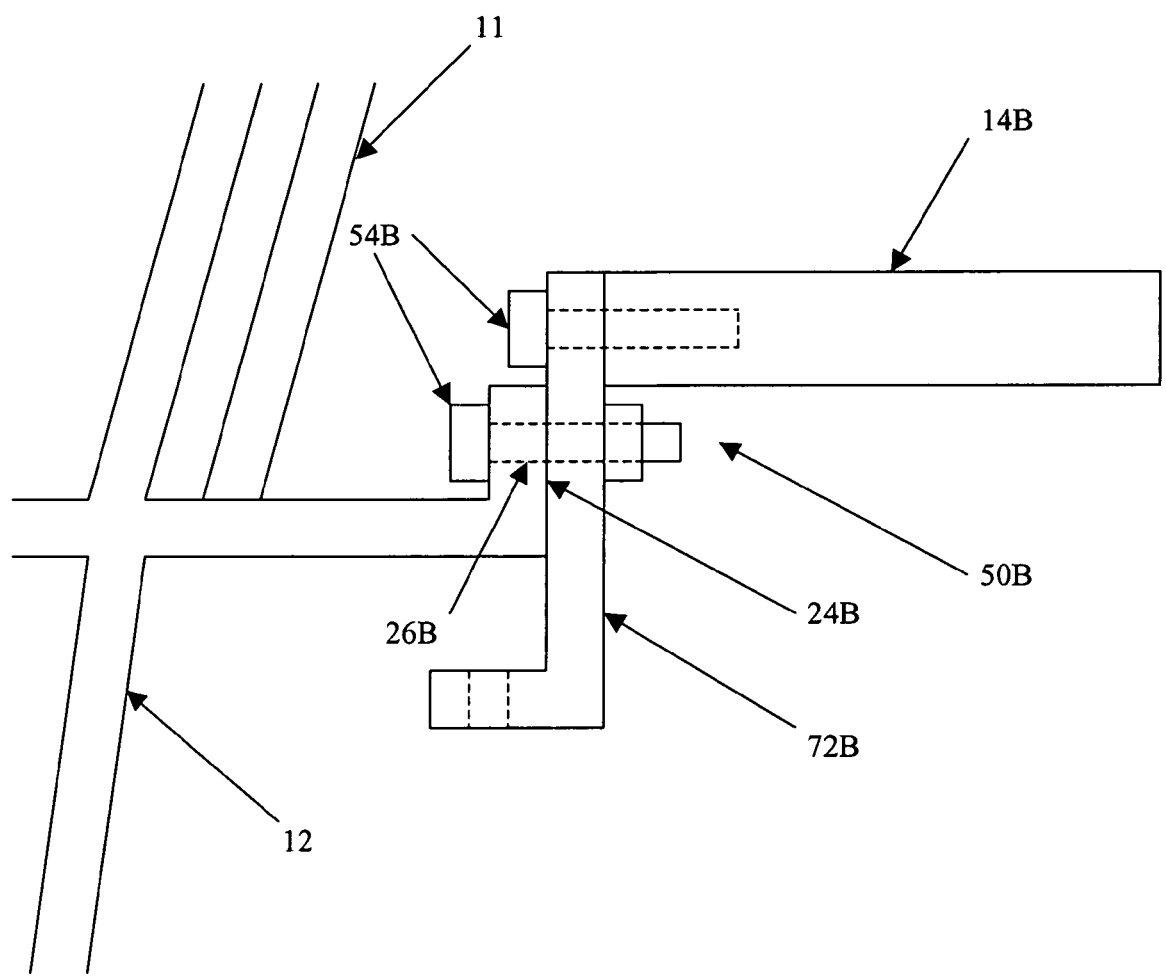
FIG. 17 is an enlarged view of another of the fenders in FIG. 9.

However, in FIGS. 16 and 17, it may be seen that although the low mounting assembly 31B is not entirely different from the high mounting assembly 50B.

FIG. 16 shows greater detail regarding the engagement of the fender bodies 14A, 14B with the vehicle 10 in their low positions as illustrated in FIG. 9. As shown, the low mounting assembly 31B includes a common bracket 72B disposed between the fender body 14B and the low mounting location 16B.

As seen in FIG. 17, which shows greater detail regarding the engagement of the fender bodies 14A (not shown), 14B with the vehicle 10 in their high positions as illustrated in FIG. 9, the high mounting assembly 50B includes the same common bracket 72B that is used in the low mounting assembly 31B. As in the low mounting assembly 31B, in the high mounting assembly 50B the common bracket 72B is disposed between the fender body 14B and the high mounting location 24B.

Thus, in both the low position and the high position the fender body 14B is engaged with the vehicle 10 via the common bracket 72B, even though the low mounting assembly 31B as a whole is not identical to the high mounting assembly 50B.

For example, returning to FIG. 16, the exemplary low mounting assembly 31B therein also includes low connectors 34B for connecting the fender body 14B with the common bracket 72B and for connecting the common bracket 72B to the vehicle 10 at the low mounting location 16B. Thus, in the low position the fender body 14B is engaged with the vehicle 10 using the low connectors 34B.

Similarly, the high mounting assembly 50B shown in FIG. 17 includes the high connectors 54B for connecting the fender body 14B with the common bracket 72B and for connecting the common bracket 72B to the vehicle 10 at the high mounting location 24B. Thus, in the high position the fender body 14B is engaged with the vehicle 10 using the high connectors 54B.

As may be seen, even when a common bracket 72B is used, other elements of the mounting assemblies may be different, such as the low connectors 34B and high connectors 54B.

In the arrangement shown in FIG. 9, one or both of the fender bodies 14A, 14B can be moved from the low position to the high position as follows. The fender bodies 14A, 14B are disengaged from the low mounting locations 16A, 16B by removing the common mounting assemblies 70A, 70B from both the fender bodies 14A, 14B and the low mounting locations 16A, 16B. The fender bodies 14A, 14B are then engaged with the high mounting locations 24A, 24B using the same common mounting assemblies 70A, 70B.

More specifically, as may be understood by a comparison of FIGS. 16 and 17, fender body 14B can be moved from its low position to its high position by disengaging the low connectors 34B, moving the common bracket 72B from the low position 16B to the high position 24B, and engaging the high connectors 54B.

Likewise, a fender body 14B similarly may be replaced or installed, as desired.

In addition, it is noted that elements other than a bracket may be common to the low and high mounting assemblies 31A, 31B and 50A, 50B. For example, another embodiment in accordance with the principles of the present invention is shown in FIG. 10, wherein low mounting assemblies 31A, 31B are used for engaging the fender bodies 14A, 14B with the vehicle 10 in the low position, and different high mounting assemblies 50A, 50B are used for engaging the fender bodies 14A, 14B with the vehicle 10 in the high position.

Figure 10:
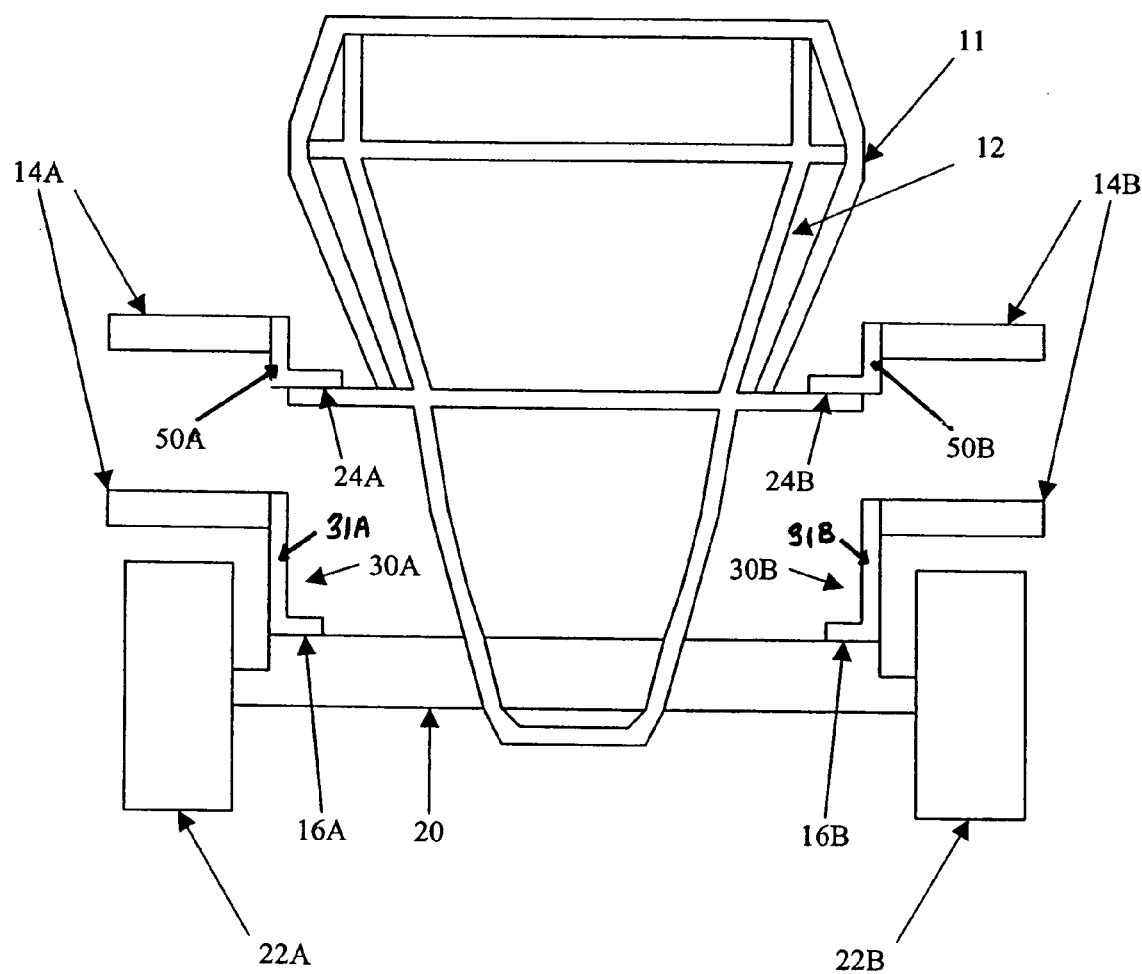
FIG. 10 is a schematic cross section of an exemplary vehicle showing front fenders in high and low positions with a high and low mounting assemblies having common connectors.

As with the embodiment shown in FIG. 9, the low and high mounting assemblies 31A, 31B and 50A, 50B in FIG. 10 are not completely unique. However, as may be seen from FIGS. 18 and 19, the low and high mounting assemblies 31B and 50B do not share a common bracket.

Figure 18:
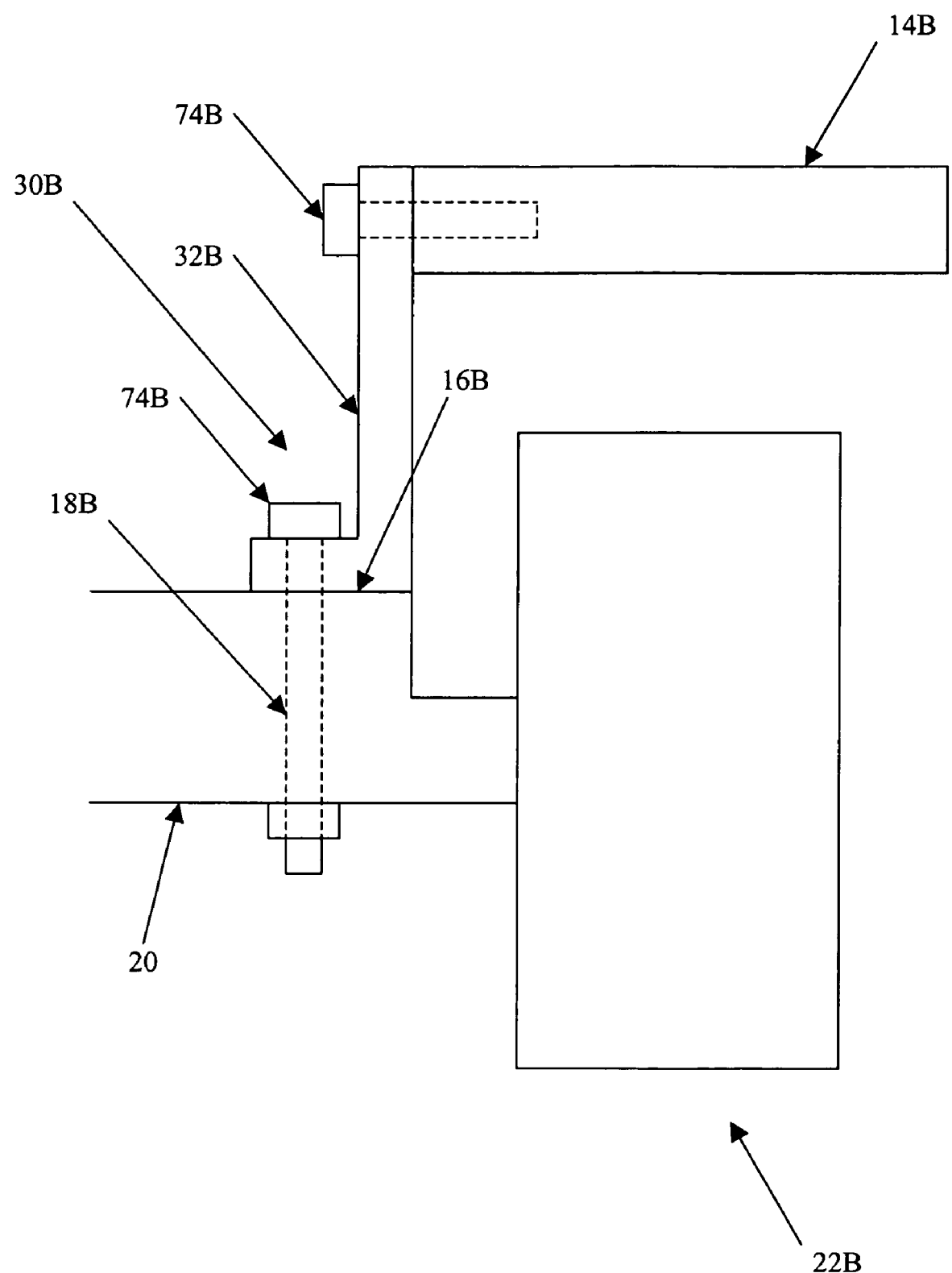
FIG. 18 is an enlarged view of one of the fenders in FIG. 10.

FIG. 18 shows greater detail regarding the engagement of the fender bodies 14A, 14B with the vehicle 10 in their low positions as illustrated in FIG. 10. As shown, the low mounting assembly 31B includes a low bracket 32B disposed between the fender body 14B and the low mounting location 16B.

Figure 19:
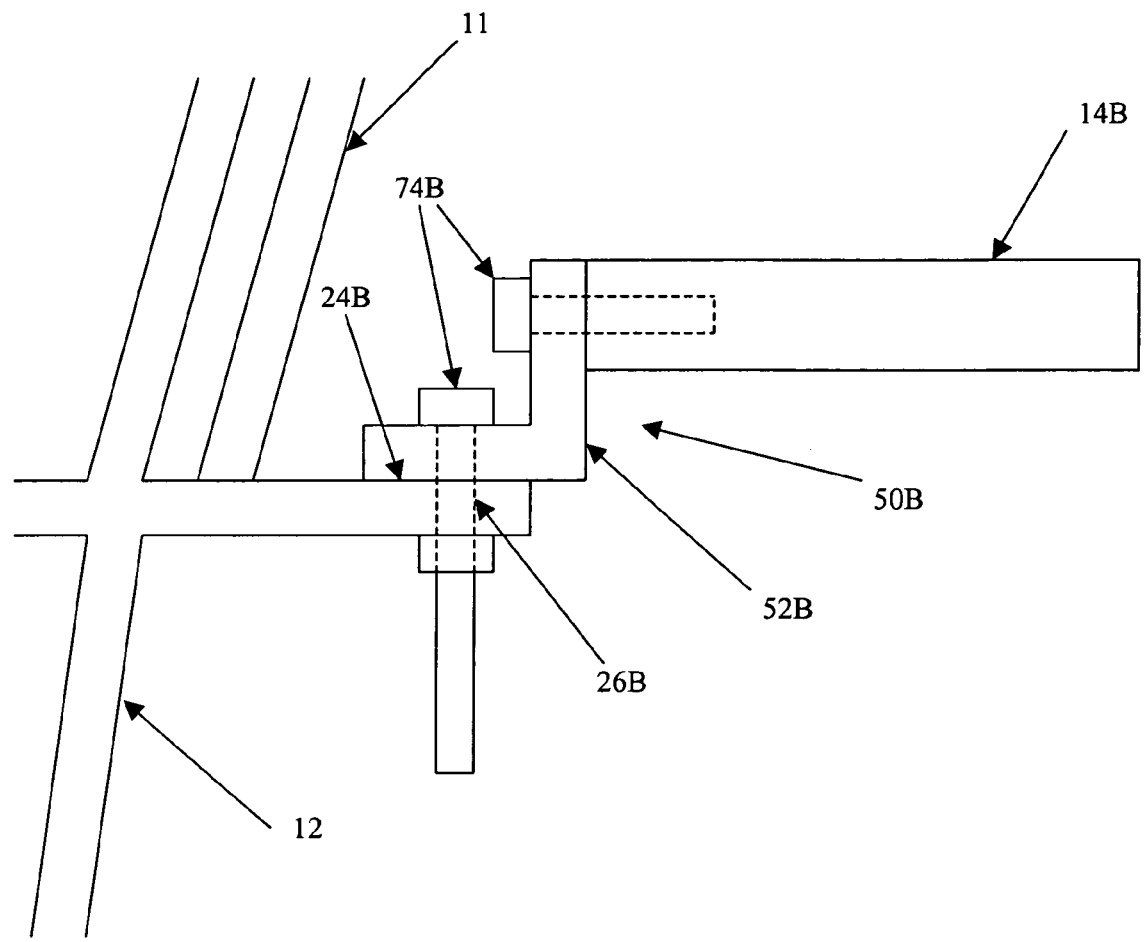
FIG. 19 is an enlarged view of another of the fenders in FIG. 10.

As seen in FIG. 19, which shows greater detail regarding the engagement of the fender bodies 14A (not shown), 14B with the vehicle 10 in their high positions as illustrated in FIG. 10, the high mounting assembly 50B includes a high bracket 52B that is different from the low bracket 32B used in the low mounting assembly 31B. As shown, in the high mounting assembly 50B the high bracket 52B is disposed between the fender body 14B and the high mounting location 24B.

However, returning to FIG. 18, the exemplary low mounting assembly 31B therein also includes common connectors 74B for connecting the fender body 14B with the low bracket 32B and for connecting the low bracket 32B to the vehicle 10 at the low mounting location 16B. Thus, in the low position the fender body 14B is engaged with the vehicle 10 using common connectors 74B.

Similarly, the high mounting assembly 50B shown in FIG. 19 includes the common connectors 74B for connecting the fender body 14B with the high bracket 52B and for connecting the high bracket 52B to the vehicle 10 at the high mounting location 24B. Thus, in the high position the fender body 14B is engaged with the vehicle 10 using the same common connectors 74B used in the low mounting assembly 31B.

As may be seen, even when a different brackets are used, other elements of the mounting assemblies may be common, such as the common connectors 74B.

In the arrangement shown in FIG. 10, one or both of the fender bodies 14A, 14B can be moved from the low position to the high position as follows. The fender bodies 14A, 14B are disengaged from the low mounting locations 16A, 16B by removing the common mounting assemblies 70A, 70B from both the fender bodies 14A, 14B and the low mounting locations 16A, 16B. The fender bodies 14A, 14B are then engaged with the high mounting locations 24A, 24B using the same common mounting assemblies 70A, 70B.

More specifically, as may be understood by a comparison of FIGS. 18 and 19, fender body 14B can be moved from its low position to its high position by disengaging the common connectors 74B, disengaging the low bracket 32B from the low position 16B, engaging the high bracket 52B with the high position 24B, and engaging the common connectors 74B.

Likewise, a fender body 14B similarly may be replaced or installed, as desired.

In addition, as noted previously, in another embodiment in accordance with the principles of the present invention, each fender 30A, 30B simultaneously may include a low mounting assembly 31A, 31B for engaging the fender bodies 14A, 14B with the vehicle 10 in the low position, and a different high mounting assembly 50A, 50B for engaging the fender bodies 14A, 14B with the vehicle 10 in the high position. Thus, each of the fender bodies 14A, 14B may be engaged simultaneously with two complete mounting assemblies 31A, 31B and 50A, 50B.

Figure 11:
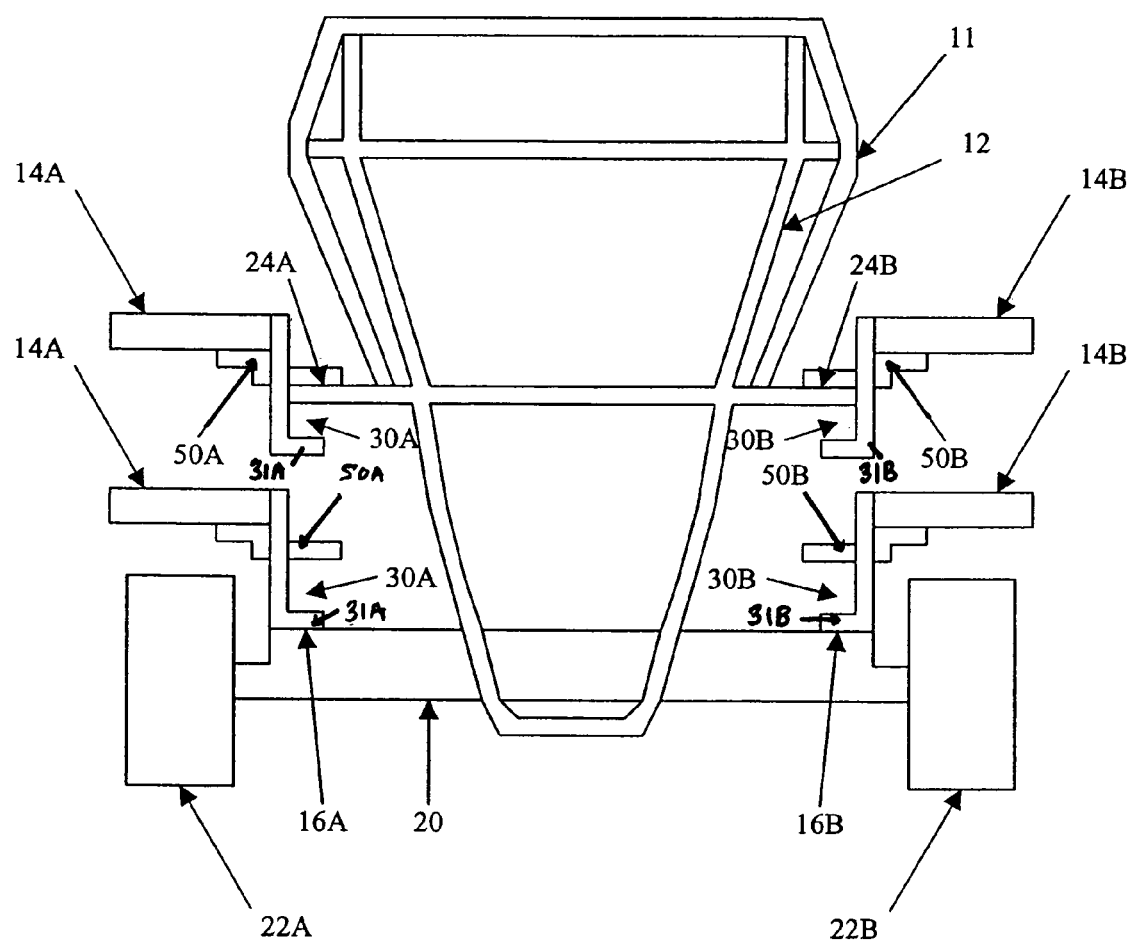
FIG. 11 is a schematic cross section of an exemplary vehicle showing front fenders in high and low positions with a high and low mounting assemblies simultaneously engaged therewith.

FIG. 11 shows a cross-section of a vehicle 10, taken across the front portion of the vehicle 10 so as to show the front fenders 30A and 30B and their fender bodies 14A and 14B. As may be seen, the vehicle 10 includes low mounting locations 16A and 16B and high mounting locations 24A and 24B at which the fender bodies 14A and 14B may engage the vehicle 10. For comparison purposes, the vehicle 10 of FIG. 11 is shown with fender bodies 14A, 14B located in both the low and the high positions.

Each fender body 14A, 14B is engaged with a low mounting assembly 31A, 31B used to engage the fender bodies 14A, 14B with the vehicle 10 in the low position. Likewise, each fender body 14A, 14B is engaged with a high mounting assembly 50A, 50B used to engage the fender bodies 14A, 14B with the vehicle 10 in the high position.

This is similar to the arrangement shown in FIGS. 6 and 7, except that whereas in that embodiment the low and high mounting assemblies 31A, 31B and 50A, 50B are used singularly, with the unneeded mounting assembly being removed. By contrast, in the embodiment of FIG. 11, both the low and high mounting assemblies 31A, 31B and 50A, 50B are present regardless of whether the fender bodies 14A (not shown), 14B are in the low or high position.

Figure 20:
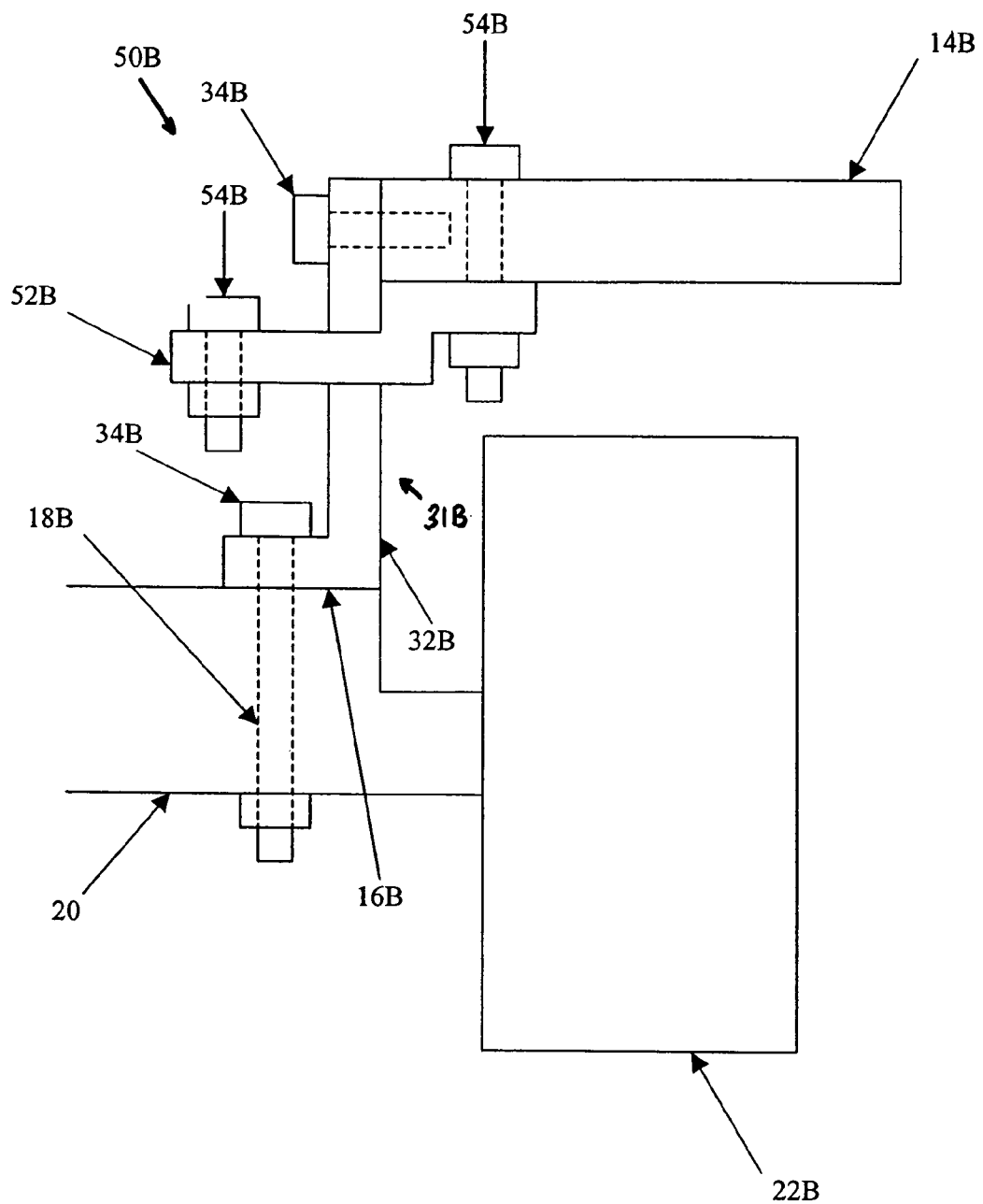
FIG. 20 is an enlarged view of one of the fenders in FIG. 11.
Figure 21:
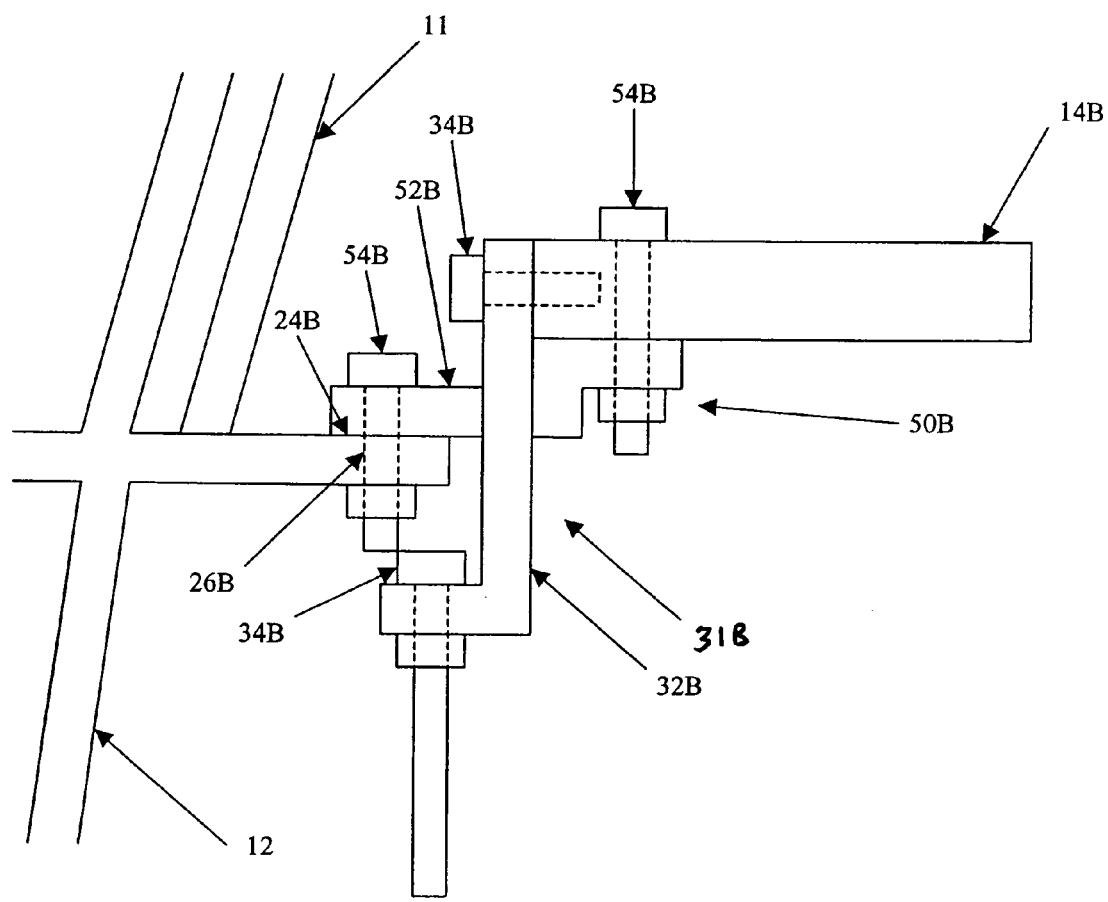
FIG. 21 is an enlarged view of another of the fenders in FIG. 11.

FIGS. 20 and 21 show greater detail regarding the engagement of the fender bodies 14A, 14B with the vehicle 10 in their low and high positions as illustrated in FIG. 11.

As shown, the fender body 14B has the low mounting assembly 31B and the high mounting assembly 50B engaged therewith. The low mounting assembly 31B includes a low bracket 32B, which in the low position is disposed between the fender body 14B and the low mounting location 16B. The high mounting assembly 50B likewise includes a high bracket 52B, which in the high position is disposed between the fender body 14B and the high mounting location 24B (not shown).

In addition, the low mounting assembly 31B includes low connectors 34B for connecting the fender body 14B with the low bracket 32B and for connecting the low bracket 32B to the vehicle 10 at the low mounting location 16B, when the fender body 14B is in the low position. Similarly, the high mounting assembly 50B includes high connectors 54B for connecting the fender body 14B with the high bracket 52B and for connecting the high bracket 52B to the vehicle 10 at the high mounting location 24B (not shown), when the fender body 14B is in the high mounting location.

In the arrangement shown in FIG. 11, one or both of the fender bodies 14A, 14B can be moved from the low position to the high position as follows. The fender bodies 14A, 14B are disengaged from the low mounting locations 16A, 16B by removing the low mounting assemblies 31A, 31B from the low mounting locations 16A, 16B. The fender bodies 14A, 14B are then engaged with the high mounting locations 24A, 24B using the high mounting assemblies 50A, 50B.

More specifically, as may be understood by a comparison of FIGS. 20 and 21, fender body 14B can be moved from its low position to its high position by disengaging at least some of the low connectors 34B, disengaging the low bracket 32B from the low position 16B, engaging the high bracket 52B in the high position 24B, and engaging the high connectors 54B.

Likewise, a fender body 14B similarly may be replaced or installed, as desired.

It is emphasized that the mounting assemblies described above are exemplary only. Other arrangements may be equally suitable. For example, for some embodiments it may be advantageous to dispense with the brackets altogether, engaging the fender bodies 14A, 14B directly with the vehicle. Similarly, some embodiments may not include separate connectors such as the nuts and bolts illustrated, instead using shape-locking elements or other arrangements to engage the fender bodies 14A, 14B.

Figure 22:
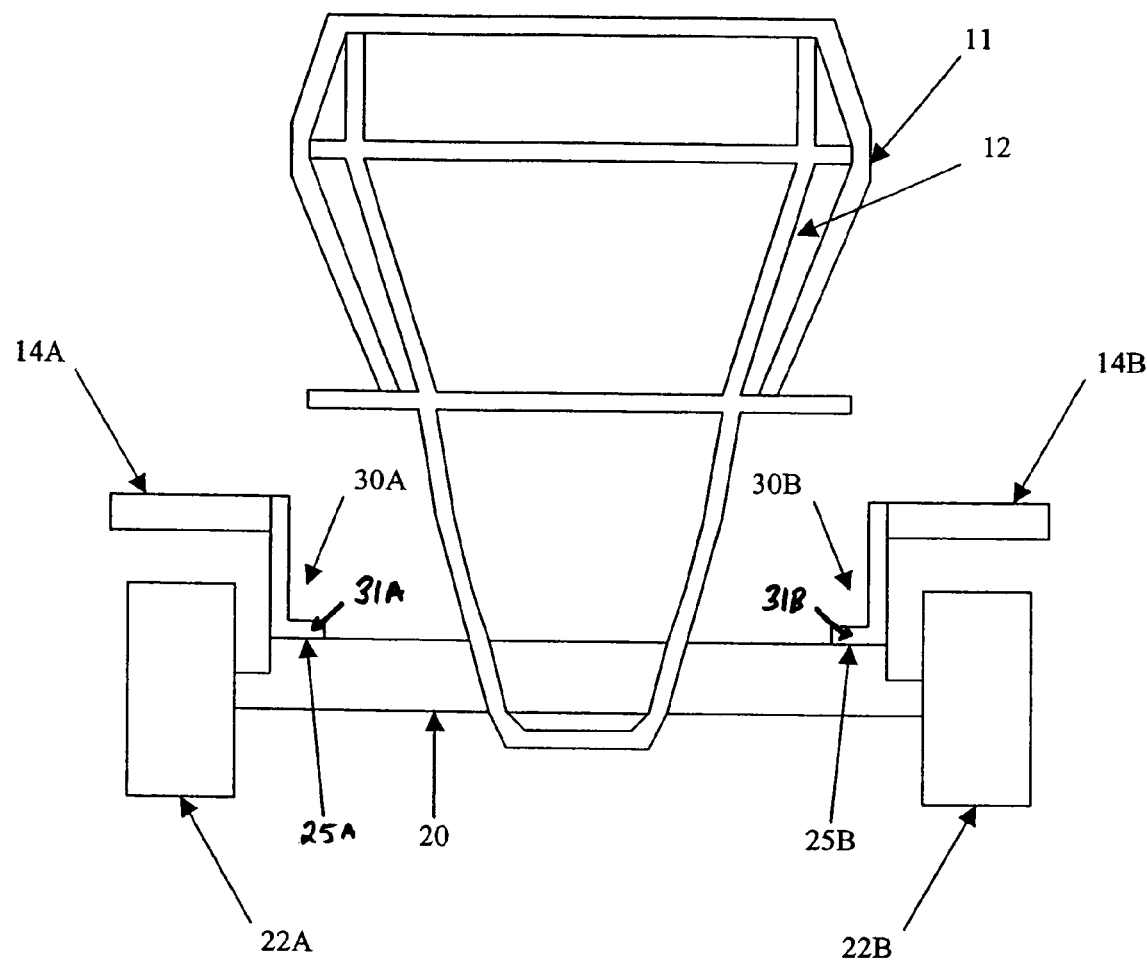
FIG. 22 is a schematic cross section of a front portion of an exemplary vehicle with a common mounting location, with front fenders in a low position.
Figure 23:
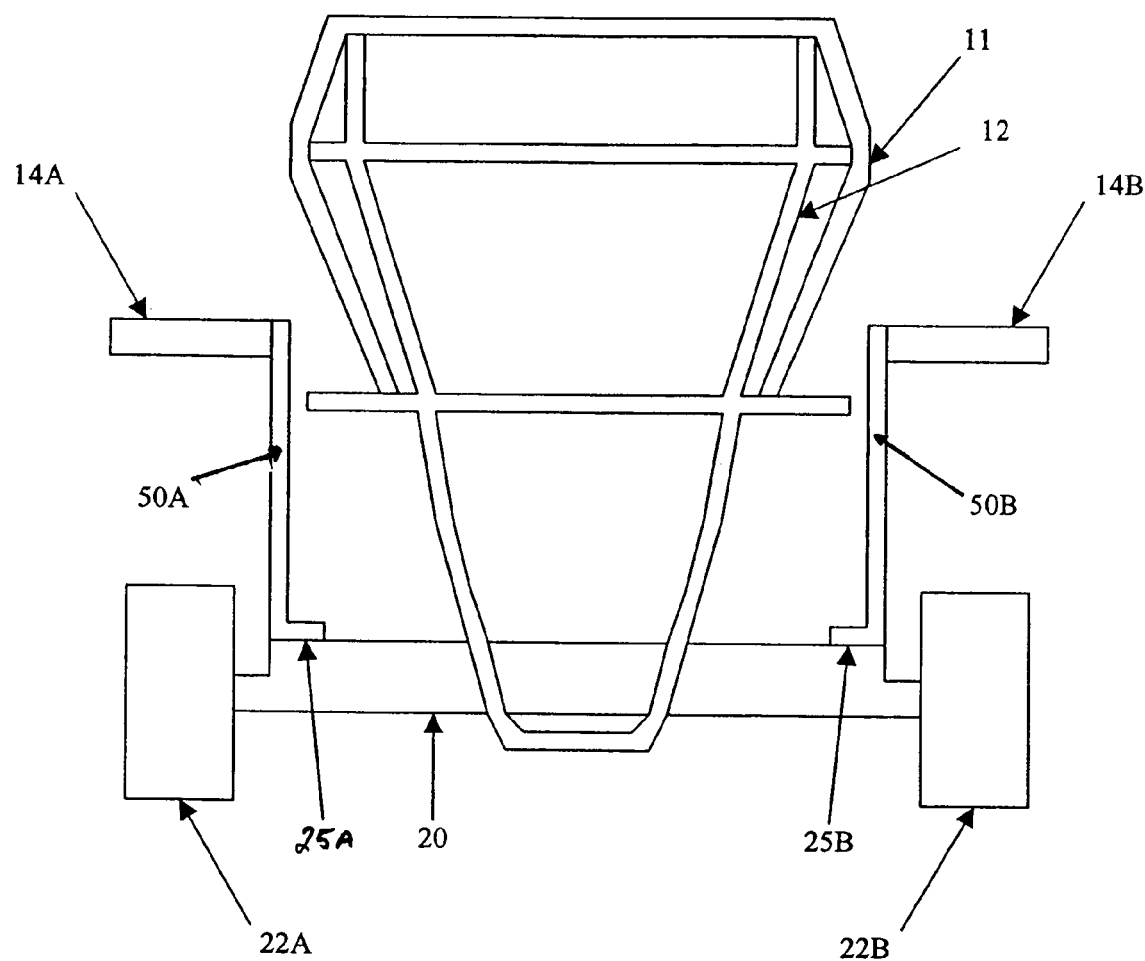
FIG. 23 is a schematic cross section of a front portion of an exemplary vehicle with a common mounting location, with front fenders in a high position.

In addition, although in the arrangements illustrated and described previously the fender bodies 14A, 14B are moved from the low to the high position by moving their point of engagement with the vehicle 10 from a low mounting location 16A, 16B to a high mounting location 24A, 24B, this is exemplary only. As may be seen from a comparison of FIGS. 22 and 23, the fender bodies 14A, 14B may be disposed in either of the low and high positions while being engaged at a common mounting location 25A, 25B for both positions. FIG. 22 shows low mounting assemblies 31A, 31B engaging the fender bodies 14A, 14B with the vehicle at the common mounting location 25A, 25B to dispose the fender bodies 14A, 14B in their low position. Similarly, FIG. 23 shows high mounting assemblies 50A, 50B engaging the fender bodies 14A, 14B with the vehicle at the common mounting location 25A, 25B to dispose the fender bodies 14A, 14B in their high position.

Thus, as may be understood, the use of low and high mounting locations 16A, 16B and 24A, 24B is exemplary only.

Furthermore, although as illustrated and described herein the low and high mounting locations 16A, 16B and 24A, 24B are disposed on the suspension 20 and frame 12 respectively of the vehicle 10, this is exemplary only. In embodiments having low and high mounting locations 16A, 16B and 24A, 24B, the low and high mounting locations 16A, 16B and 24A, 24B may be disposed elsewhere on the vehicle 10. Likewise, for embodiments having common mounting locations 25A, 25B, the common mounting locations 25A, 25B may be disposed elsewhere on the vehicle 10 than on the suspension 20 as is illustrated in FIGS. 22 and 23.

As previously noted, the engagement of the fender bodies 14A, 14B, 40A, and 40B with the vehicle 10 at one respective location does not exclude further engagement of the fender bodies 14A, 14B, 40A, and 40B at additional locations.

Figure 24:
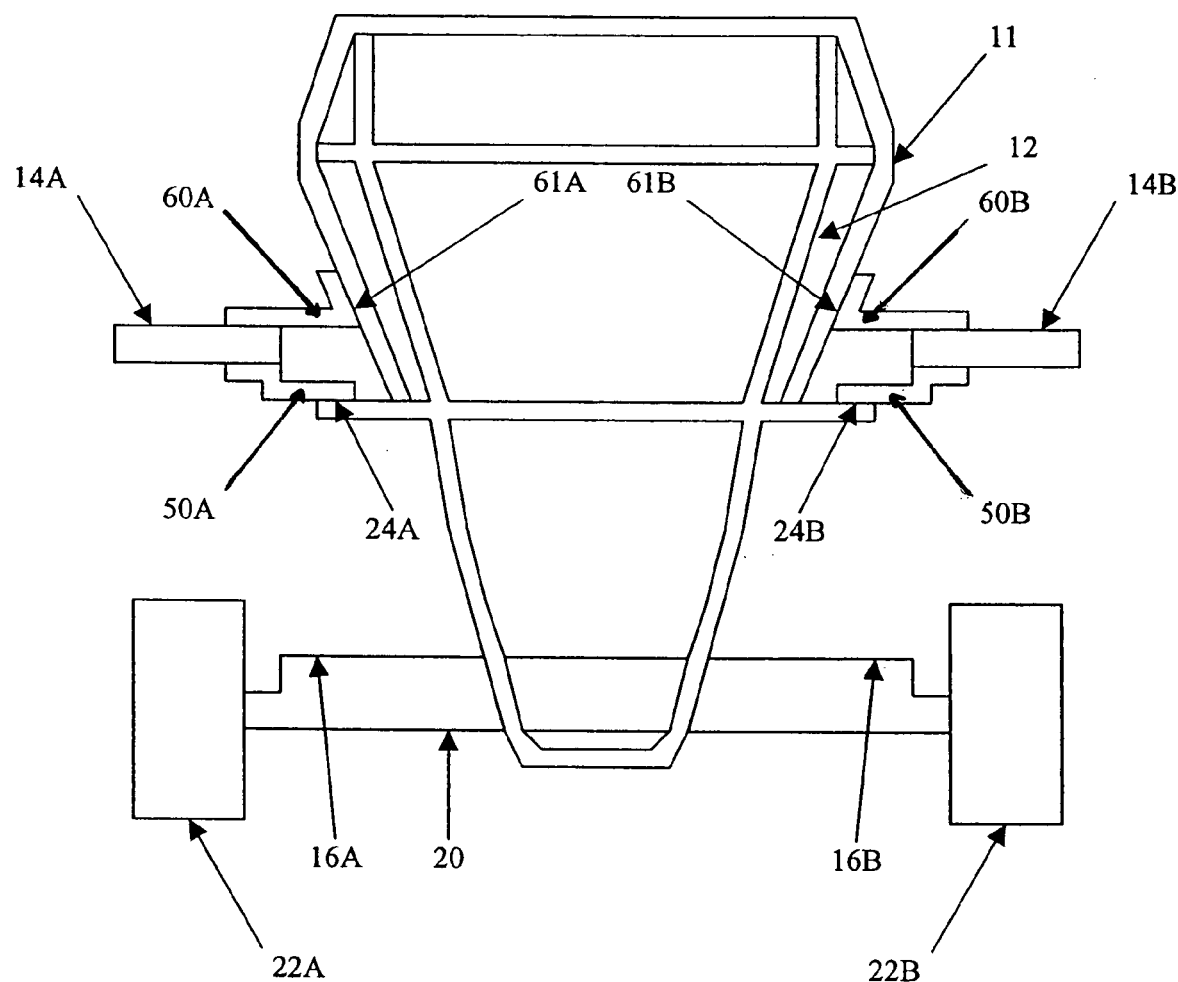
FIG. 24 is a schematic cross section of a front portion of an exemplary vehicle, with front fenders in a high position, further including an additional bracket engaged with the vehicle body.

For example, as shown in FIG. 24, fender bodies 14A and 14B are in the high position, engaged with the vehicle 10 at the high mounting locations 24A and 24B on the vehicle frame 12 via the high mounting assemblies 50A and 50B respectively. However, in addition, the fender bodies 14A and 14B are engaged with the vehicle 10 at locations 61A and 61B on the vehicle body 11 via the mounting assemblies 60A and 60B respectively.

For purposes of discussion herein, locations 61A and 61B are hereinafter referred to as body mounting locations 61A and 61B, and mounting assemblies 60A and 60B are referred to as body mounting assemblies 60A and 60B. However, it is emphasized that this is exemplary only; additional mounting locations are not limited only to mounting locations on the vehicle body 11, likewise additional mounting assemblies are not limited only to those suitable for mounting to the vehicle body 11.

As shown in FIG. 24, the body mounting assemblies 60A and 60B are separate components, distinct from the high mounting assemblies 50A and 50B. However, this is exemplary only.

Figure 25:
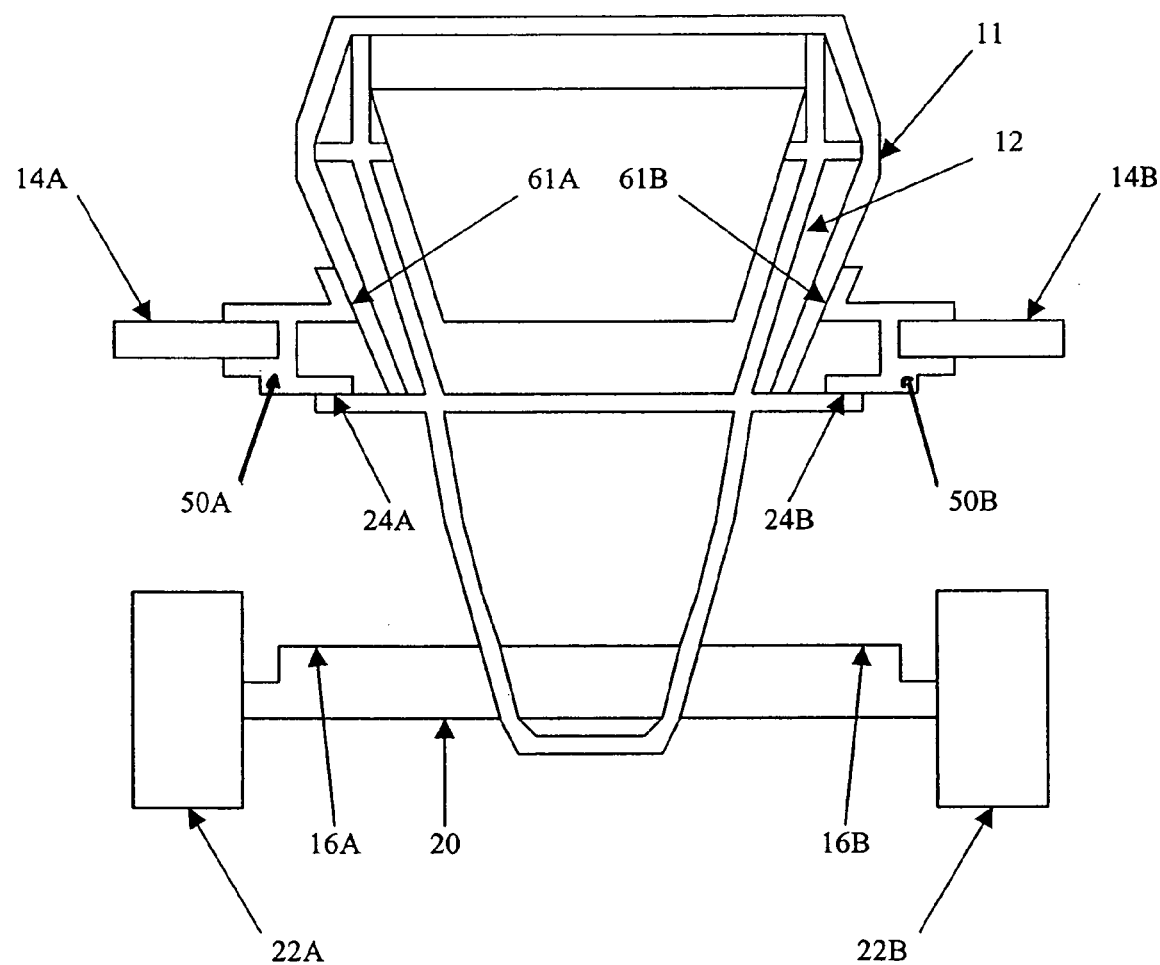
FIG. 25 is a schematic cross section of a front portion of an exemplary vehicle, with front fenders in a high position, wherein the bracket further engages with the vehicle body.

FIG. 25 shows an alternative arrangement, wherein the high mounting assemblies 50A and 50B facilitate mounting both at the high mounting locations 24A, 24B and the body mounting locations 61A, 61B. Effectively, the high mounting assemblies 50A and 50B in FIG. 25 incorporate body mounting assemblies 60A and 60B (not separately identified in FIG. 25) therein.

Figure 28:
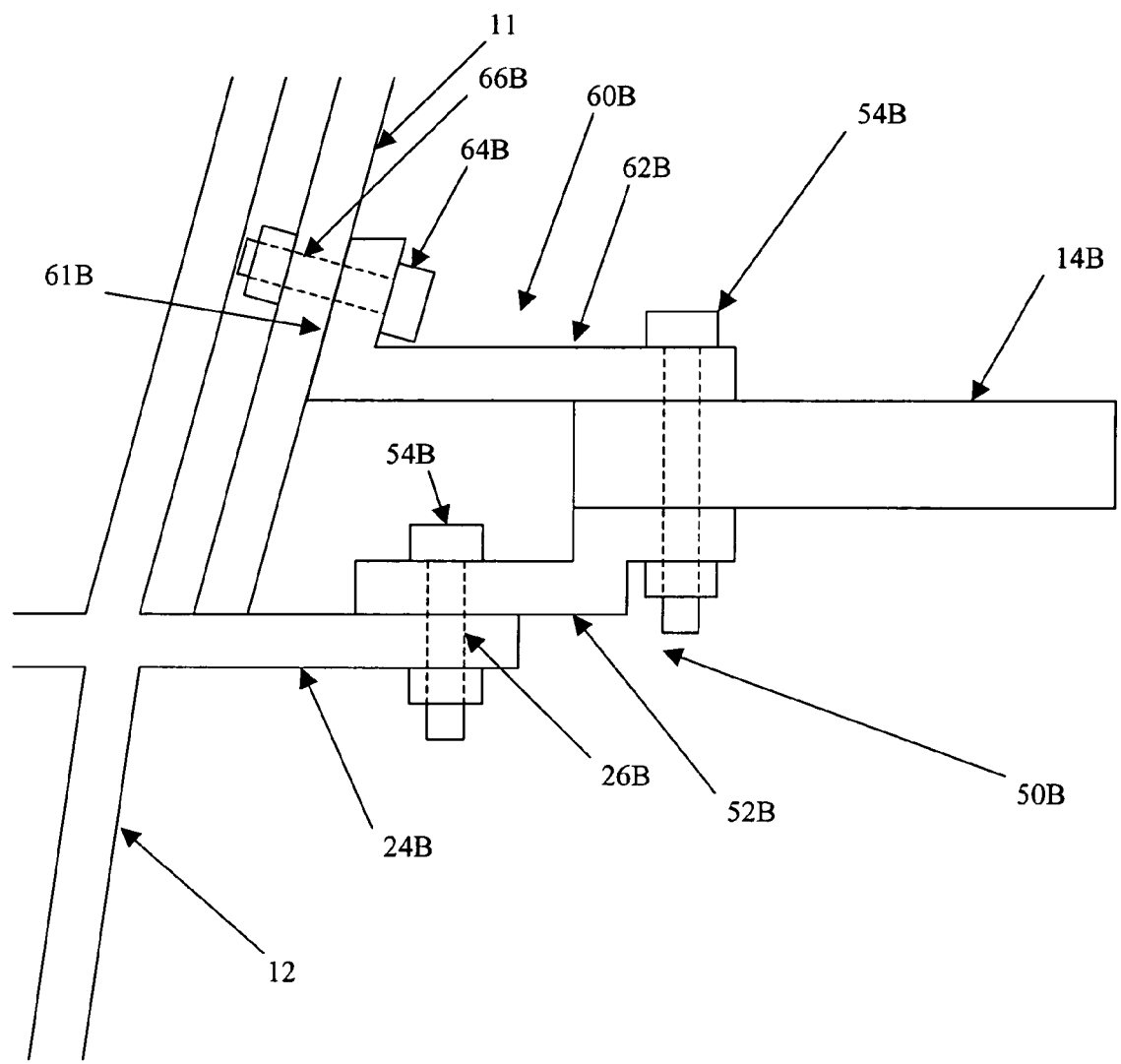
FIG. 28 is an enlarged view of one of the fenders in FIG. 24.
Figure 29:
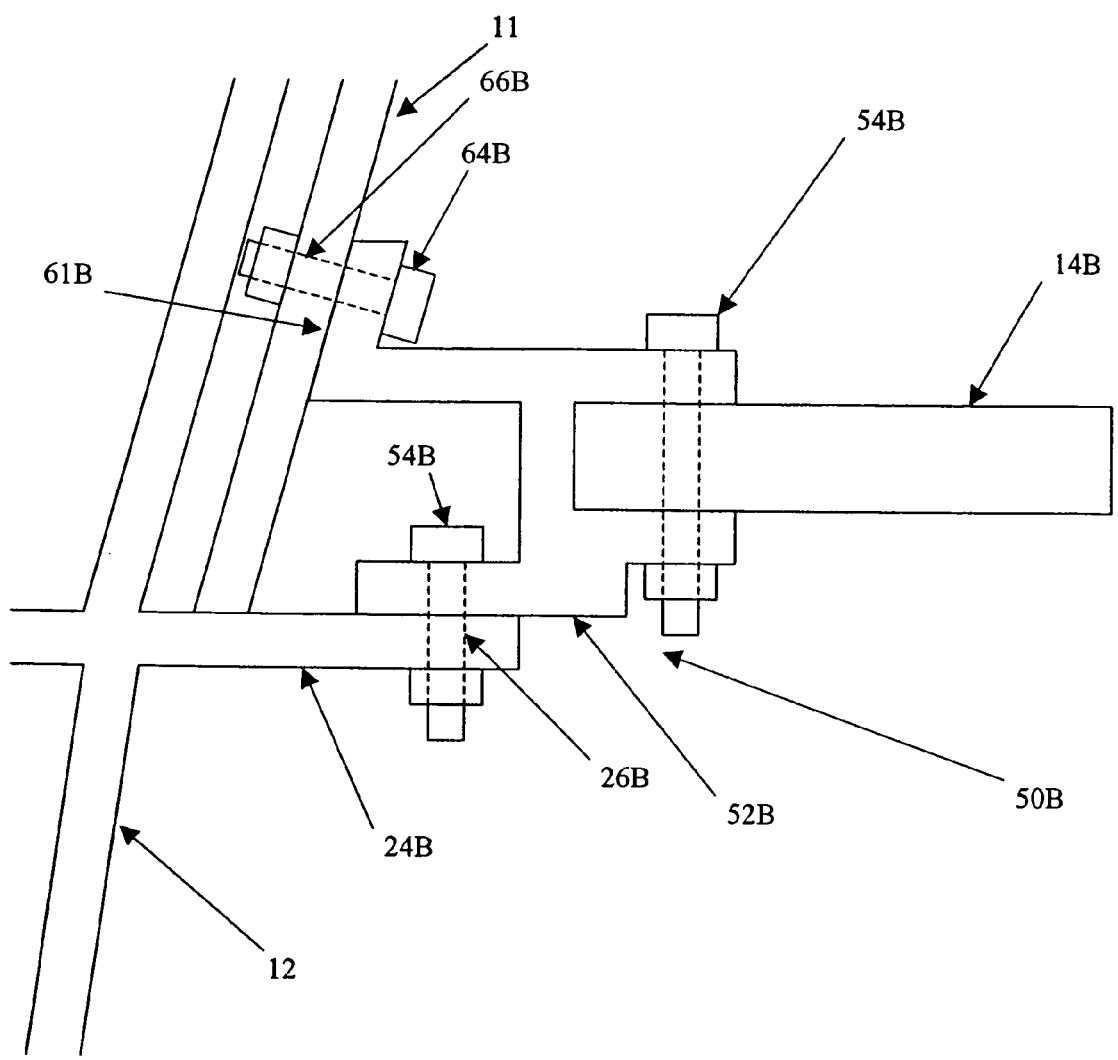
FIG. 29 is an enlarged view of one of the fenders in FIG. 25.

FIGS. 28 and 29 show enlarged views of the fenders in FIGS. 24 and 25, respectively. The arrangements shown therein are to some degree similar to those in FIG. 13, though this is exemplary only. However, similar components already described with regard to FIG. 13 will not be described again in detail with regard to FIGS. 28 and 29.

As shown in FIG. 28, the high mounting assembly 50B includes a high bracket 52B disposed between the fender body 14B and the high mounting location 24B, so that the fender body 14B is engaged with the vehicle 10 via the high bracket 52B. The high mounting assembly 50B shown also includes high connectors 54B for connecting the fender body 141 with the high bracket 52B and for connecting the high bracket 52B to the vehicle 10 at the high mounting location 24B, so that the fender body 14B is engaged with the vehicle 10 using the high connectors 54B.

In addition, the body mounting assembly 60B in FIG. 28 includes a body bracket 62B disposed between the fender body 14B and the body mounting location 61B. Thus, the fender body 14B is engaged with the vehicle 10 via the body bracket 62B, as well as via the high bracket 52B. The body mounting assembly 60B shown also includes body connectors 64B for connecting the body bracket 62B to the vehicle 10 at the body mounting location 61B, so that the fender body 14B is engaged with the vehicle 10 using the body connectors 64B.

As shown in FIG. 28, one of the high connectors 54B connects the fender body 14B with both the high bracket 52B and the body bracket 62B. However, although such "sharing" of connectors is not prohibited, neither is it required. The high connectors 54B may be dedicated exclusively to connection via the high bracket 52B, and the body connectors 64B may likewise be dedicated exclusively to connection via the body bracket 62B.

In addition, as with connectors 34B, 54B, connectors 64B may be quick release connectors. Connectors 64B may be sacrificial break-away connectors, such that some portion of the connectors 64B bends or breaks more readily than the fender body 14A, 14B and/or the remainder of the body mounting assembly 60A (not shown), 60B.

Also as shown in FIG. 28, the vehicle 10 may include structures thereon for facilitating the engagement of the fender body 14B therewith via the body mounting assembly 60B. As illustrated, a body support 66B is provided in the form of a hole drilled into the body 11 at the body mounting location 61B for receiving a body connector 64B therein. However, such an arrangement is exemplary only. Other supports may be equally suitable, including but not limited to pins extending from the vehicle, reinforced areas on the vehicle, etc. In particular, supports that do not require holes in the vehicle 10 may be suitable for some embodiments. Furthermore, body supports 66B may not be present at all in some embodiments.

FIG. 29 also shows an arrangement wherein the high mounting assembly 50B includes a high bracket 52B disposed between the fender body 14B and the high mounting location 24B, so that the fender body 14B is engaged with the vehicle 10 via the high bracket 52B. However, as shown the high mounting assembly 50B also is disposed between the fender body 14B and the body mounting location 61B. Effectively, the high mounting assembly 50B shown in FIG. 29 incorporates into a single structure the high mounting assembly 50B and body mounting assembly 60B shown in FIG. 28.

Figure 26:
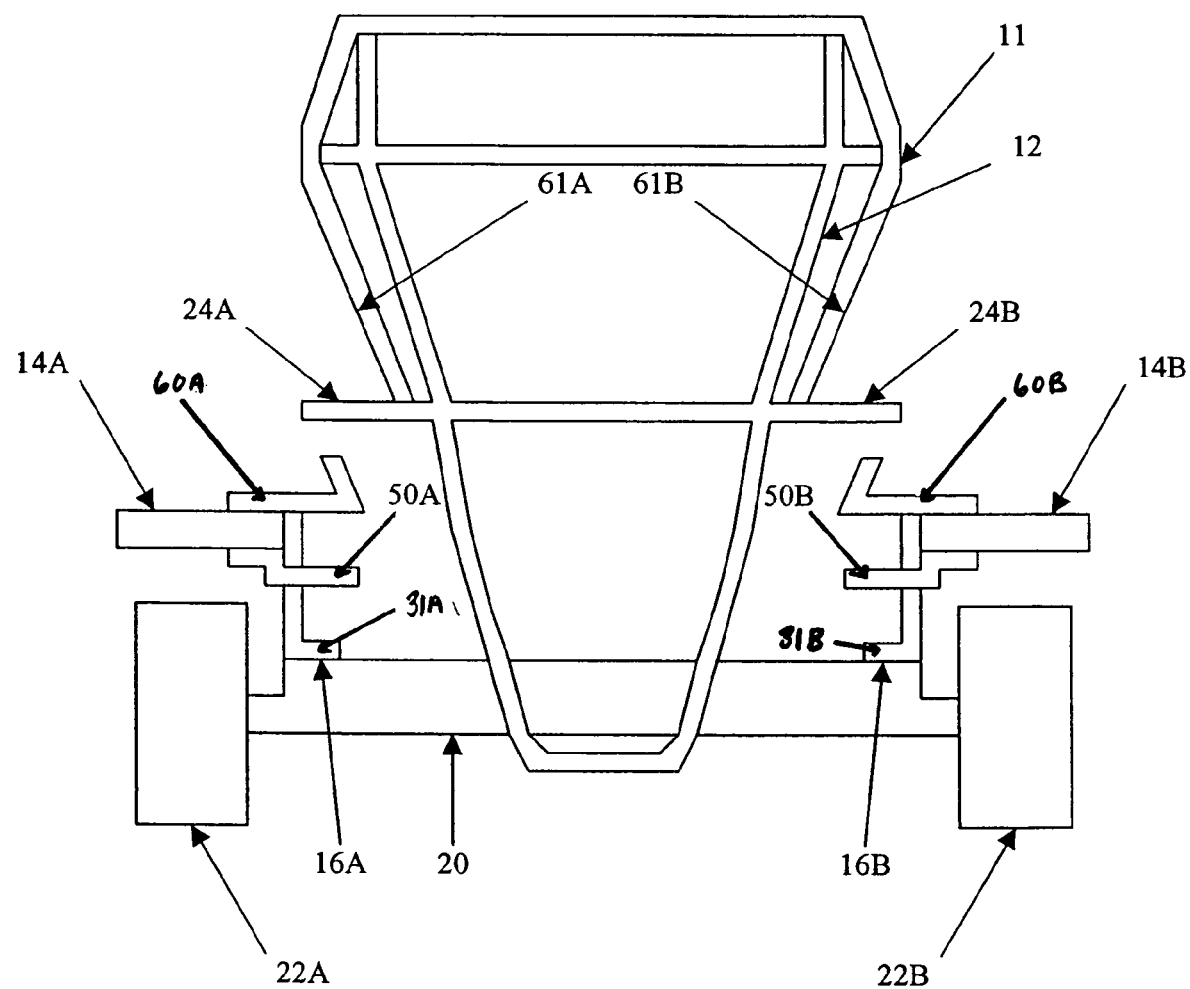
FIG. 26 is a schematic cross section of an exemplary vehicle showing front fenders in a low position with a high and low mounting assemblies simultaneously engaged therewith, and an additional bracket for engagement with the vehicle body.
Figure 27:
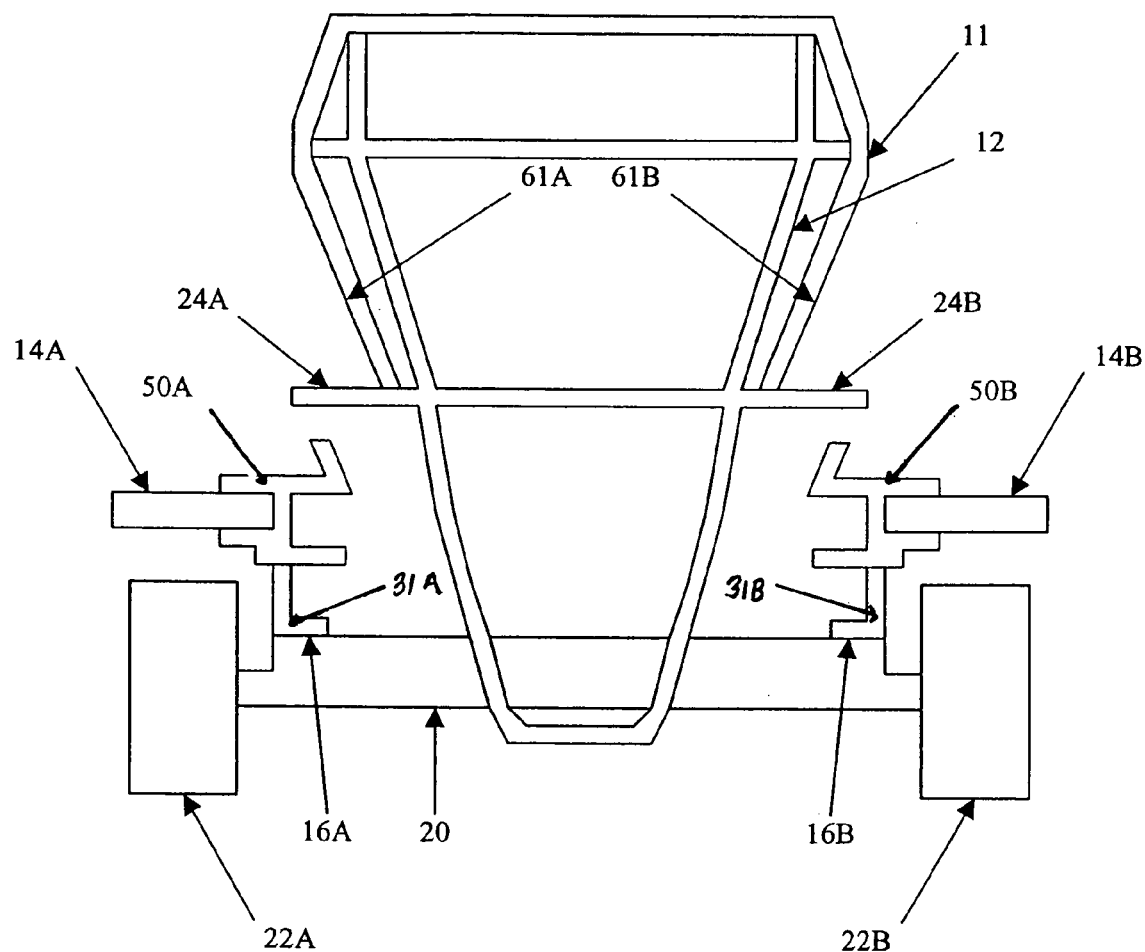
FIG. 27 is a schematic cross section of an exemplary vehicle showing front fenders in a low position with a high and low mounting assemblies simultaneously engaged therewith, the high bracket being adapted for engagement with the vehicle body.

As noted previously, for some embodiments both the low mounting assemblies 31A, 31B and the high mounting assemblies 50A, 50B may remain engaged with the fender body 14B, even when they are not being used to engage the fender body 14 with the vehicle 10. As shown in FIGS. 26 and 27, this is equally true with regard to the body mounting assemblies 60A, 60B.

FIGS. 26 and 27 show fender bodies 14A, 14B in the low position. Even though the high mounting assemblies 50A, 50B and the body mounting assemblies 60A, 60B are not used to engage the fender bodies 14A, 14B with the vehicle in that position, they may remain present as shown. FIG. 26 shows high mounting assemblies 50A, 50B and body mounting assemblies 60A, 60B that are separate, as in FIG. 24, and FIG. 27 shows high mounting assemblies 50A, 50B that also serve as body mounting assemblies (not separately numbered therein). as in FIG. 25.

With regard to their use, and depending on the particular embodiment, the body mounting assemblies 60A, 60B may also have to be installed, removed, and/or replaced as the low mounting assemblies 31A, 31B and the high mounting assemblies 50A, 50B. Installation, removal, and replacement of fender bodies 14A, 14B when body mounting assemblies 60A, 60B are present is similar to those processes described above for arrangements where body mounting assemblies 60A, 60B are not present, with the addition of similar manipulations of brackets, connectors, etc. associated with the body mounting assemblies 60A, 60B.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A method for connecting a fender assembly to an all terrain vehicle having a frame and a suspension secured to the frame, the method comprising:
   providing a fender body, the fender body being configured to at least partially cover a wheel of an all-terrain vehicle;
   providing a mounting assembly securable to the fender body and selectively securable to the frame and the suspension; and
   securing the mounting assembly to one of the frame and the suspension.

2. An all-terrain vehicle fender assembly, comprising:
   a fender body, the fender body configured to at least partially cover a wheel of an all-terrain vehicle; and
   a mounting assembly, the mounting assembly being coupled to the fender body,
   wherein the mounting assembly is configured to be coupled to either of a frame and a wheel suspension of the all-terrain vehicle.

3. An all-terrain vehicle comprising:
   a frame for supporting an engine, said frame including an upper fender mount location;
   a suspension assembly coupled to said frame, said suspension assembly including a lower fender mount location;
   a wheel secured to said suspension assembly; and
   at least one fender assembly including a mount selectively securable to either the upper fender mount location and the lower fender mount location.

4. A fender assembly for an all-terrain vehicle having a frame holding an engine and a wheel suspension secured to the frame, the fender assembly comprising:
   at least one mount assembly selectively securable to said frame and to said wheel suspension; and
   at least one fender secured to said at least one mount assembly.

5. The method according to claim 1, further comprising removing the mounting assembly from the one of the frame and the suspension; and securing the mounting assembly to the other of the frame and the suspension.

6. The fender assembly according to claim 2, wherein:
   the fender body is adjustable in any direction relative to the all-terrain vehicle selected from the list comprising:
   vertically,
   horizontally, and
   laterally.

7. The fender assembly according to claim 2, wherein:
   the wheel is any selected from the list comprising a front wheel and a rear wheel of the all-terrain vehicle.

8. The all-terrain vehicle of claim 3, wherein said at least one fender assembly comprises an upper mount assembly and a lower mount assembly, said upper mount assembly configured for securing a fender to said frame at said upper fender mount location, said lower mount assembly configured for securing a fender to said frame at said lower mount location.

9. The all-terrain vehicle of claim 8, wherein said at least one fender assembly comprises a single fender selectively securable to said upper fender mount location and said lower fender mount location.

10. The all-terrain vehicle of claim 8, wherein said at least one fender assembly comprises at least two fenders, an upper fender configured to be secured at said upper fender mount location and a lower fender configured to be secured at said lower fender mount location.

11. The all-terrain vehicle of claim 3, wherein said at least one fender assembly comprises a single mount member selectively securable to said upper and said lower fender mount locations.

12. The all-terrain vehicle of claim 11, wherein said at least one fender assembly comprises a single fender securable to said mount member, such that said single fender is selectively securable to said upper and said lower fender mount locations.

13. The all-terrain vehicle of claim 3, wherein said wheel is selected from the list comprising a front wheel and a rear wheel of the all-terrain vehicle.

14. The fender assembly of claim 4, wherein said at least one mount assembly comprises a frame mount assembly for securement to said frame and a suspension mount assembly for securement to said wheel suspension.

15. The fender assembly of claim 14, wherein said at least one fender comprises a frame fender and a suspension fender, said frame fender being secured to said frame mount, said suspension fender being secured to said suspension mount.

16. The fender assembly of claim 14, wherein said at least one fender comprises a fender that is selectively mountable to said frame mount and to said suspension mount.

17. The fender assembly of claim 4, wherein said at least one mount assembly includes a mount member selectively securable to said frame and to said wheel suspension.

18. The fender assembly of claim 17, wherein said at least one fender comprises a fender secured to said mount member.

* * * * *